US012767562B2

(12) United States Patent
Zou

(10) Patent No.: US 12,767,562 B2
(45) Date of Patent: Oct. 20, 2026

(54) JANUS COMPOSITE FOR OIL IN WATER SEPARATION

(71) Applicant: Khalifa University of Science and Technology, Abu Dhabi (AE)

(72) Inventor: Linda Zou, Abu Dhabi (AE)

(73) Assignee: Khalifa University of Science and Technology, Abu Dhabi (AE)

(*) Notice: Subject to any disclaimer, the term of this patent is extended or adjusted under 35 U.S.C. 154(b) by 769 days.

(21) Appl. No.: 17/928,076

(22) PCT Filed: Jun. 3, 2021

(86) PCT No.: PCT/IB2021/054878
§ 371 (c)(1),
(2) Date: Nov. 28, 2022

(87) PCT Pub. No.: WO2021/250515
PCT Pub. Date: Dec. 16, 2021

(65) Prior Publication Data

US 2023/0212037 A1 Jul. 6, 2023

Related U.S. Application Data

(60) Provisional application No. 63/037,795, filed on Jun. 11, 2020, provisional application No. 63/142,028, filed on Jan. 27, 2021.

(51) Int. Cl.
*C02F 1/28* (2023.01)
*B01J 20/02* (2006.01)
(Continued)

(52) U.S. Cl.
CPC ........... *C02F 1/281* (2013.01); *B01J 20/0218* (2013.01); *B01J 20/20* (2013.01); *B01J 20/24* (2013.01);
(Continued)

(58) Field of Classification Search
CPC .......................... C02F 1/281; C02F 2101/325; C02F 2103/16; C02F 2103/32; C02F 2103/365;
(Continued)

(56) References Cited

U.S. PATENT DOCUMENTS 2,920,983 A * 1/1960 Bugosh ...................... C08J 9/40 521/905
4,481,113 A * 11/1984 Canevari ............. B01J 20/3092 427/314
(Continued)

FOREIGN PATENT DOCUMENTS

CN 108439373 B 12/2019
KR 20180082884 A 7/2018

OTHER PUBLICATIONS

J. Gu, H. Fan, C. Li, J. Caro, H. Meng, Angew. Chem. Int. Ed. 2019, 58, 5297 (Year: 2019).*
(Continued)

*Primary Examiner* — Bobby Ramdhanie
(74) *Attorney, Agent, or Firm* — Billion & Armitage

(57) ABSTRACT

The present disclosure features a Janus composite having a hydrophobic nanoparticulate component and a 2- or 3-dimensional hydrophilic framework, and materials, systems, methods of making the Janus composite and methods of using the Janus composite for separating oil from an oil-in-water emulsion. For example, Janus composites with MoS2 nanospheres on/in a hydrophilic reduced graphene oxide (rGO) or cellulose acetate framework are provided.

14 Claims, 16 Drawing Sheets

(51) Int. Cl.

*B01J 20/20* (2006.01)
*B01J 20/24* (2006.01)
*B01J 20/28* (2006.01)
*C02F 101/32* (2006.01)
*C02F 103/16* (2006.01)
*C02F 103/32* (2006.01)
*C02F 103/36* (2006.01)

(52) U.S. Cl.

CPC ... *B01J 20/28016* (2013.01); *C02F 2101/325* (2013.01); *C02F 2103/16* (2013.01); *C02F 2103/32* (2013.01); *C02F 2103/365* (2013.01)

(58) Field of Classification Search

CPC ........ B01J 20/0218; B01J 20/20; B01J 20/24; B01J 20/28016
USPC .......................................................... 210/691
See application file for complete search history.

(56) References Cited

U.S. PATENT DOCUMENTS

| | | | | |
|---|---|---|---|---|
| 10,322,952 | B1 * | 6/2019 | Bader | B01D 3/007 |
| 2007/0297858 | A1 * | 12/2007 | Imbrie | B09C 1/002<br>405/128.45 |
| 2017/0369322 | A1 * | 12/2017 | Mangadlao | B01J 23/52 |

OTHER PUBLICATIONS

Pan., et al., Rapid synthesis of zeolitic imidazolate framework-8 (ZIF-8) nanocrystals in an aqueous system, Chem. Commun., 2011,47, 2071-2073 (Year: 2011).*

K. S. Park, Z. Ni, A. P. Cote, J. Y. Choi, R. D. Huang, F. J. Uribe-Romo, H. K. Chae, M. OâKeeffe and O. M. Yaghi, Proc. Natl. Acad. Sci. U. S. A., 2006, 103, 10186. (Year: 2006).*

Wen-Qian Chen, et al., MoS2/ZIF-8 Hybrid Materials for Environmental Catalysis: Solar-Driven Antibiotic-Degradation Engineering, Engineering, vol. 5, Issue 4, 2019, pp. 755-767, ISSN 2095-8099, https://doi.org/10.1016/j.eng.2019.02.003. (Year: 2019).*

M. Bobra, Solubilty Behaviour of Petroleum Oils in Water, Environment Canada, Environmental Protection Directorate, Ottawa, May 1992, https://www.bsee.gov/sites/bsee.gov/files/osrr-oil-spill-response-research/120ax (Year: 1992).*

Joy et al., (2020). Hydrophobic, superabsorbing materials from reduced graphene oxide/MoS2 polyurethane foam as a promising sorbent for oil and organic solvents. Polymer Testing. 87. 106429. 10.1016/j.polymertesting.2020.106429. (Year: 2020).*

X. Gao, et al., Flexible Superhydrophobic and Superoleophilic MoS2 Sponge for Highly Efficient Oil-Water Separation., Scientific Reports | 6:27207 | DOI: 10.1038/srep27207 (2016) (Year: 2016).*

"International Search Report and Written Opinion Received mailed Aug. 11, 2021", Aug. 11, 2021, 8 pages.

"A White Paper Describing Produced Water from Production of Crude Oil, Natural Gas, and Coal Bed Methane", Jan. 2004, 87 pages.

Binks, B. P. , et al., "Particles Adsorbed at the Oil-Water Interface: A Theoretical Comparison between Spheres of Uniform Wettability and "Janus" Particles", Langmuir 2001, 17, 4708-4710.

De Gennes, P. G. , "Soft matter", Reviews of Modern Physics, vol. 64, No. 3, Jul. 1992.

Igunnu, Ebenezer T., et al., "Produced water treatment technologies", International Journal of Low-Carbon Technologies 2014, 9, 157-177.

"Extended European Search Report Mailed on Jun. 3, 2024", 13 Pages.

Huang, J.Y. , "Robust superhydrophobic TiO 2 @fabrics for UV shielding, self-cleaning and oil-water separation", Journal of Materials Chemistry A, vol. 3, No. 6, Jan. 1, 2015 (Jan. 1, 2015), pp. 2825-2832, XP093164185, 1-15 Pages.

Jiahui, et al., "Robust Superhydrophobic/Superoleophilic Wrinkled Microspherical MOF@rGO Composites for Efficient Oil Water Separation", Angewandte Chemie, Wiley—V C H Verlag Gmbh & Co. KGaA, DE, vol. 131, No. 16, Apr. 8, 2019 (Apr. 8, 2019), pp. 5351-5355, XP055882714, DE, 4 Pages.

Liu, Can, "Versatile fabrication of the magnetic polymer-based graphene foam and applications for oil-water separation", Olloids and Surfaces A : Physiochemical and Engineerings Aspects, vol. 468, Mar. 1, 2015 (Mar. 1, 2015), pp. 10-16, XP093164131.

Nisar, et al., "Dynamics of oil-water interface demulsification using multifunctional magnetic hybrid and assembly materials", Journal of Molecular Liquids, Elsevier, Amsterdam, NL, vol. 312, May 25, 2020 (May 25, 2020), XP086246140,, 1-15 Pages.

Sherif, et al., "Nanotechnology-based sorption and membrane technologies for the treatment of petroleum-based pollutants in natural ecosystems and wastewater streams", Advances in Colloid and Interface Science, Elsevier, NL, vol. 275, Nov. 21, 2019 (Nov. 21, 2019), XP086033355,, 1-15 Pages.

Wang, Wei, "Self-assembled MoS 2 /rGO nanocomposites with tunable UV-IR absorption", RSC Advances, vol. 8, No. 5, Jan. 1, 2018 (Jan. 1, 2018), pp. 2410-2417, XP093164107, GB ISSN: 2046-2069, DOI: 10.1039/C7RA12455D.

Xiao, et al., "Magnetically responsive Janus nanoparticles synthesized using cellulosic materials for enhanced phase separation in oily wastewaters and water-in-crude oil emulsions", Chemical Engeneering Journal, Elsevier, Amsterdam, NL, vol. 378, Jun. 22, 2019 (Jun. 22, 2019), XP085832903,, 1-15 Pages.

* cited by examiner

JANUS COMPOSITE FOR OIL IN WATER SEPARATION

BACKGROUND

With the increased energy demand in the world, the exploration and production of oil and natural gas will continuously be a significant part of the energy operation. A very large amount of the produced water is generated by oil and gas extraction production operations. Crude oil is commonly produced together with water (i.e., produced water) at a ratio of wastewater to oil of 5:1 barrels or higher. The water creates several problems and usually increases the unit cost of oil production.

The quality of the produced water varies greatly from case to case. Nowadays, conventional methods of wastewater disposal become less feasible due to geographical limitation and environmental concerns. Produced water often contains few hundred parts per million (ppm) of dispersed oil and dissolved organic matters (DOCs) such as hydrocarbons. Hydrocarbons that occur naturally in produced water include organic acids, polycyclic aromatic hydrocarbons (PAHs), phenols, and volatiles. These hydrocarbons are likely contributors to produced water toxicity and require treatment before discharge.

Separation of micro-sized oil droplets from produced water remains a substantial challenge. The hydrocarbon/oil droplets can be very fine, i.e., less than 20 μm, are very stable in water, and have low settling velocities. They have little chance to be settled by gravity, so they are extremely hard to remove from water efficiently with current technologies (e.g., skimming, centrifugation, gravity settling, etc.). Therefore, finding new efficient solutions for separating fine oil droplets and other trace hydrocarbons is critically important to the oil and gas industry.

A range of standalone or combined physical, biological, and chemical treatment technologies have been employed by the industrial operators to manage the produced water, and remove the fine oil droplets from the water. For example, membrane filtration technology, including low pressure membrane processes such as microfiltration and ultrafiltration membranes, has been used to remove oil from water, but requires frequent cleaning of the membranes. High pressure membrane technologies, such as reverse osmosis and nanofiltration membranes are efficient, but require high capital and energy inputs in addition to a pre-treatment system. Thermal technologies, such as multistage flash, multi-effect distillation, vapor compression distillation and combination of the two processes can be used to treat the highly concentrated produced water, however, these high energy demand processes are only feasible at the location where energy is relatively cheap. Adsorption is also used to remove dissolved organic carbon and oil and hydrocarbons. Utilizing different adsorbents, such as activated carbon, organoclays, activated alumina and zeolites, currently used adsorbent materials exhibit homogeneous wettability. The normal homogeneous nanomaterials are surface active at the water-oil interface, but are not oleophilic (or amphiphilic in biology).

Janus particles are named after the two faced Roman god Janus since they possess two distinct types of properties (e.g. FIGS. 1A-B). The research interest on this topic has been ever increasing. The main advantage offered by Janus particles over other nanoparticles is that they can offer an anisotropic structure or an anisotropic distribution of functional groups, however, both can only be achieved by advanced engineering and manipulation at nanoscale. The majority of the Janus particle research has been related to the self-assembly of block co-polymer and organic ligands or masking by polymers. Only few reports of the preparation of multiple component heterodimers type of inorganic Janus particles are available.

SUMMARY

The present disclosure features materials, systems, and methods for separation of oil from oil-in-water emulsions. In particular, the present disclosure features a Janus composite for separating oil from oil-in-water emulsions. In some cases, the composites are Janus nanostructures which possess heterogenous wettability (hydrophobic/hydrophilic dual properties e.g., as illustrated in FIG. 2) and are capable of separating oil from the aqueous phase of the emulsion by de-emulsifying, coalescing, and trapping the oil for efficient collection of fine oil droplets.

In a first aspect, the present disclosure describes a Janus composite for adsorbing oil from an oil-in-water emulsion, the composite comprising a hydrophobic nanoparticulate component supported by a 2- or 3-dimensional hydrophilic framework. The hydrophobic nanoparticulate component can be uniformly disposed on the 2 to 3-dimensional hydrophilic framework. The composite can have net water contact angle of greater than 90° and a net oil contact angle of less than 70°. The hydrophobic nanoparticulate component can have a water contact angle within a range of about 135° to about 170° and an oil contact angle within a range of less than 40°. The 2- or 3-dimensional hydrophilic framework can have a water contact angle within a range of less than about 40° to about 90°. The hydrophobic nanoparticulate component can include nanomaterial represented by the general formula $M_aE_b$, wherein M is Zn, Cd, Hg, Cu, Ag, Al, Ga, In, Si, Ge, Pb, Sb, Pd, Fe, Au, Ti, Bi, W, Mo, V or a mixture thereof, E is O, S, Se, Te, N, P, As, or a mixture thereof, and a and b are independently an integer of 1 to 5. The hydrophobic nanoparticulate component can comprise a plurality of hydrophobic nanoparticles. In some embodiments, the nanoparticles have an average largest dimension of about 5 nm to about 5000 nm. The 2- or 3-dimensional hydrophilic framework can comprise a hydrophilic ceramic, hydrophilic metal oxide, composites of hydrophilic metal oxides, graphene oxide, reduced graphene oxide, or a hydrophilic polymer selected from the group hydrophilic polyurethane, polyurea, polyurethane/polyurea, polyester polyurethane, polyalkylene oxides, cellulose, alginate, chitin, chitosan, pectin, gelatin, collagen, carrageenan, hyaluronic acid, pectin, starch, xanthan gum, cellulose acetate, cellulose acetate propionate, and cellulose acetate butyrate. The hydrophobic nanoparticulate component can comprise nanospheres of $MoS_2$ and the 2- or 3-dimensional hydrophilic framework can comprise reduced graphene oxide (rGO) or cellulose acetate.

In another aspect, the present disclosure describes a use of the Janus composite of the first aspect to partially or fully pack a structure for separating oil from an oil-in-water emulsion, or to make a dispersion in an oil-in-water emulsion. The structure can be a cartridge, sponge or other device to facilitate oil separation.

In another aspect, the present disclosure describes a use of the Janus composite of the first aspect to separate oil from oil-in-water emulsion. The use can include contacting the oil-in-water emulsion with the Janus composite. In some cases, the use includes agitating the emulsion with the Janus composite. Contacting can include flowing the emulsion over a filter device comprising the Janus composite, or flowing the emulsion through a cartridge comprising the Janus composite. The filter device can further include a polymer. The emulsion can include petroleum refinery wastewaters, produced water, flowback water from fracking operations, water from industrial cleaning, steel manufacturing, bilge and ballast water, food processing wastewater, agricultural wastewater, or sewage effluent. The oil of the emulsion can comprise dissolved organic carbon (DOCs), hydrocarbons, polycyclic aromatic hydrocarbons (PAHs), organic acids, phenols, or volatile compounds. The emulsion can include at least about 1 parts per billion (ppb) oil. The use can include removing a de-oiled water fraction from the emulsion. The removed de-oiled water fraction can contain less than 1 ppb oil. The use can include physical or chemical regeneration of the Janus composite for reuse.

In another aspect, the present disclosure describes a Janus nanocomposite for use adsorbing oil of an oil-in-water emulsion, the nanocomposite comprising a superhydrophobic nanoparticulate component supported by a 3-dimensional hydrophilic framework. The superhydrophobic nanoparticulate component can be uniformly disposed on the 3-dimensional hydrophilic framework. The Janus nanocomposite can have a net water contact angle of greater than 90° to about 130°, The Janus nanocomposite can have a net oil contact angle within the range of about 40° to about 70°. The superhydrophobic nanoparticulate component can have a water contact angle within a range of about 135° to about 170° and an oil contact angle within a range of about 20° to about of 40°. The 3-dimensional hydrophilic framework can have a water contact angle within a range of about 60° to about 90°. The superhydrophobic nanoparticulate component can include nanomaterial represented by the general formula $M_aE_b$, wherein Mis Zn, Cd, Hg, Cu, Ag, Al, Ga, In, Si, Ge, Pb, Sb, Pd, Fe, Au, Ti, Bi, W, Mo, V or a mixture thereof, E is O, S, Se, Te, N, P, As, or a mixture thereof, and a and b are independently an integer of 1 to 5. The superhydrophobic nanoparticulate component can include a plurality of superhydrophobic nanoparticles. The nanoparticles can have an average largest dimension of about 50 nm to about 500 nm. The 3-dimensional hydrophilic framework can include a hydrophilic ceramic, hydrophilic metal oxide, composites of hydrophilic metal oxides, graphene oxide, reduced graphene oxide, or a hydrophilic polymer selected from the group hydrophilic polyurethane, polyurea, polyurethane/polyurea, polyester polyurethane, polyalkylene oxides, cellulose, alginate, chitin, chitosan, pectin, gelatin, collagen, carrageenan, hyaluronic acid, pectin, starch, and xanthan gum, cellulose acetate, cellulose acetate propionate, and cellulose acetate butyrate. The superhydrophobic nanoparticulate component can include nanospheres of $MoS_2$ and the 3-dimensional hydrophilic framework can include reduced graphene oxide (rGO) or cellulose acetate.

In another aspect, the present disclosure describes an oil-separating device, such as a cartridge comprising a cartridge housing at least partially filled with a Janus nanocomposite of any one of the embodiments of the preceding aspect.

In another aspect, the present disclosure describes a method of separating oil from an oil-in-water emulsion, the method comprising contacting an oil-in-water emulsion with a Janus nanocomposite of any one of the embodiments of the aspects above to adsorb oil and produce a de-oiled water fraction. The emulsion can include petroleum refinery wastewaters, produced water, flowback water from fracking operations, water from industrial cleaning, steel manufacturing, bilge and ballast water, food processing wastewater, agricultural wastewater, or sewage effluent. The oil of the emulsion can include dissolved organic carbon (DOCs), hydrocarbons, polycyclic aromatic hydrocarbons (PAHs), organic acids, phenols, or volatile compounds. The emulsion can include at least 1 part per billion (ppb) oil up to about 100 to about 500 parts per million (ppm) oil. The oil of the emulsion can have an average droplet size within a range of about 200 nm to about 20 microns. The method can further include agitating the emulsion with or flowing pass the Janus nanocomposite. The method can further include removing the de-oiled water fraction. The removed de-oiled water fraction can contain less than 1 ppm oil or as specified. The step of contacting can include flowing the emulsion over a filter device comprising the Janus nanocomposite, or flowing the emulsion through cartridge comprising the Janus nanocomposite. The filter device can further comprise a polymer. The method can further include regenerating the Janus nanocomposite for reuse. Regenerating can be accomplished by chemical or physical method.

The details of one or more examples are set forth in the description below. Other features, objects, and advantages will be apparent from the description and from the claims.

BRIEF DESCRIPTION OF DRAWINGS

The drawings illustrate generally, by way of example, but not by way of limitation, various embodiments discussed in the present document.

Reference is made to illustrative embodiments that are depicted in the figures, in which.

DETAILED DESCRIPTION

Figure 1A:
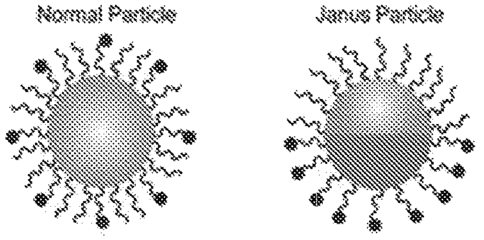
FIG. 1A (Prior Art)
FIGS. 1A-B depict (A) illustrations of a normal particle and a representative Janus particle of the prior art; and (B) a schematic of the contact angels (a and B) of the Janus particle at oil-water interface.

Embodiments of the present disclosure include materials, systems, and methods for separation of oil from oil-in-water emulsions using a Janus composite having a hydrophobic nanoparticulate component and a 2- or 3-dimensional hydrophilic framework component.

Definitions

The terms recited below have been defined as described below. All other terms and phrases in this disclosure shall be construed according to their ordinary meaning as understood by one of skill in the art.

The term "composite" refers to a as multiphase material that exhibits significant proportion of properties of its constituent phases.

The term "nanocomposite" refers to a multiphase solid material where one of the phases has one, two or three dimensions of less than 100 nanometers (nm).

The abbreviation "rGO" refers to reduced Graphene Oxide, a carbon nanoarchitecture material. rGO can be obtained from graphene oxide through reduction (e.g., electrochemical reduction, chemical reduction, or thermal reduction whereby oxygen groups are removed).

The term "2-dimensional hydrophilic framework" refers to a hydrophilic material that is nano-sized in a single dimension (e.g., a nanosheet).

The term "nanoparticle" as used herein includes particles that are less than about 5 microns in the widest dimension.

The abbreviation "MN-rGO" refers to a nanocomposite of $MoS_2$ nanospheres and 3-dimensional reduced graphene oxide.

The term "oil" as used herein refers to any organic liquid which is substantially immiscible with water and which either has a specific gravity appreciably different from that of water or which exhibits such difference when the specific gravity of the water is altered by a solute dissolved therein. Exemplary oils include petroleum products/hydrocarbons, fats, alkanes, aromatic compounds, and organic solvents, e.g., chloroform, benzene, toluene, ethylbenzene, acetonitrile, dichloromethane and xylenes.

The term "capacity" as used herein with respect to a Janus nanocomposite refers to a ratio between the mass of the trapped oil and the dry weight of the Janus nanocomposite.

A. Janus Composite Compositions

A Janus composite of the present disclosure is not only surface active, but also hydrophobic/oleophilic. This special property of the Janus composite is advantageous for trapping a large number of fine oil droplets to make them coalesce. The relative proportions and wettability of each component are selected to impart a net hydrophobic character to the Janus composite.

The Janus composite includes a hydrophobic or superhydrophobic nanoparticulate component and a 2- or 3-dimensional hydrophilic framework component. The hydrophobic or superhydrophobic nanoparticulate component is disposed on, distributed over, or otherwise supported by the 2- or 3-dimensional hydrophilic framework component. The nanoparticulate component can be distributed uniformly on the 2-dimensional framework, throughout the 3-dimensional framework component or distributed non-uniformly one the 2-dimensional framework or over the 3-dimensional framework component (e.g., present only on the outermost surfaces of the framework).

The Janus composite can have a net water contact angle of greater than 90°, such as 90° to about 130° and optionally a net oil contact angle of less than 70°, such as about 40° to about 70°. The net water contact angle (and oil contact angle) can be tailored by adjusting the relative proportions and/or wettability of each component based on the properties of the oil-in-water emulsion. The weight ratio of the hydrophobic or superhydrophobic nanoparticulate component to the 2- or 3-dimensional hydrophilic framework in the Janus composite can be about 1:1 to about 1:24, such as about 1:19, 1:17, 1:15, 1:12, 1:10, 1:9, 1:6, 1:5, 1:4, and 1:3. In some cases, the Janus composite is about 1-30% hydrophobic or superhydrophobic nanoparticulate component by weight and about 70-99% 2— to 3-dimensional hydrophilic framework by weight, such as about 1-10%, 5-10%, or 22-26% superhydrophobic nanoparticulate component by weight and about 90-99%, 90-95% or 74-78% 3-dimensional hydrophilic framework by weight.

In embodiments that include a a superhydrophobic nanoparticulate component, the nanoparticulate component has a water contact angle within a range of about 135° to about 170°. For example, the superhydrophobic nanoparticulate component can have a water contact angle of 135°, 140°, 145°, 150°, 155°, 160°, 165°, 170°, or 175°. The superhydrophobic character of the nanoparticulate component can be imparted by surface chemistry and/or surface roughness.

The hydrophobic or superhydrophobic nanoparticulate can also be oleophilic. In some cases, the hydrophobic or superhydrophobic nanoparticulate has an oil contact angle within a range of about 20° to about 40°, such as about 30°.

The 2- or 3-dimensional hydrophilic framework has a water contact angle equal to or less than 90° e.g., within a range of 90° to about 50°. For example, the 3-dimensional hydrophilic framework can have a water contact angle of 90°, 88°, 86°, 85°, 84°, 83°, 81°, 78°, 72°, 65° or 60°. The 3-dimensional hydrophobic framework is typically less oleophilic than the hydrophobic or superhydrophobic nanoparticulate component. In some cases, the 3-dimensional hydrophobic framework has an oil contact angle of about 50° to about 80°, such as about 60°.

The hydrophobic nanoparticulate component can include any hydrophobic nanomaterial. In some cases, the hydrophobic nanomaterial is represented by the general formula $M_aE_b$, wherein M is Zn, Cd, Hg, Cu, Ag, Al, Ga, In, Si, Ge, Pb, Sb, Pd, Fe, Au, Ti, Bi, W, Mo, V or a mixture thereof, E is O, S, Se, Te, N, P, As, or a mixture thereof, and a and b are independently an integer of 1 to 5. In some cases, the hydrophobic nanoparticulate component include inorganic materials represented by the general formula $MX_n$ wherein M is a transition metal, X is oxygen or a chalcogen and n is 1 or 2.

The superhydrophobic nanoparticulate component can include any superhydrophobic nanomaterial. In some cases, the superhydrophobic nanomaterial is represented by the general formula $M_aE_b$, wherein M is Zn, Cd, Hg, Cu, Ag, Al, Ga, In, Si, Ge, Pb, Sb, Pd, Fe, Au, Ti, Bi, W, Mo, V or a mixture thereof, E is O, S, Se, Te, N, P, As, or a mixture thereof, and a and b are independently an integer of 1 to 5. In some cases, the superhydrophobic nanoparticulates include inorganic materials represented by the general formula $MX_n$ wherein M is a transition metal, X is oxygen or a chalcogen and n is 1 or 2. In some cases, the superhydrophobic nanoparticulate component comprises or consists of $MoS_2$.

The hydrophobic or superhydrophobic nanoparticulate component can include a plurality of nanoparticles. The nanoparticles can have a unimodal particle size distribution. The nanoparticles can have an average largest dimension of 5 nm to 5000 nm. In some case, the nanoparticles have an average largest dimension of about 50 nm to about 500 nm. In some cases, the nanoparticles have an average largest dimension of less than or equal to about 400 nm, less than or equal to about 350 nm, less than or equal to about 250 nm, less than or equal to about 200 nanometers, less than or equal to about 150 nm, and greater than or equal to about 100 nm. In a specific embodiment, the nanoparticles comprise or consist of $MoS_2$ nanoparticles having an average particle size within a range of about 100 nm to about 150 nm.

The hydrophobic or superhydrophobic nanoparticulates can have any shape. For example, the nanoparticulates can be nanosheets, nanorods, nanoplatelets, nanoplates, nanocrystals, nanoprisms, nanowalls, nanodisks, nanowires, nanopowder, nanotubes, nanoribbons, nanocubes, nanospheres, nanoballs, nanocoils, nanocones, nanostars, or nanoflowers. In a specific embodiment, the nanoparticulates of the Janus composite or nanocomposite comprise or consist of $MoS_2$ nanospheres having an average particle size within a range of about 100 nm to about 150 nm. The nanospheres can be hollow.

The 2- or 3-dimensional hydrophilic framework imparts the Janus composite with a low-density structure. The 2-dimensional hydrophilic framework can be a crystalline solid consisting of a single layer of atoms. The 3-dimensional hydrophilic framework component is a porous material having surface hydrophilic groups.

The 3-D framework can be characterized by (1) average pore size, (2) preparation method and (3) composition. In some cases, the 3-dimensional hydrophilic framework is a sponge, aerogel or foam. The porous material can be nanoporous, mesoporous, macroporous, or a combination thereof. The porous material can include interconnected porous structures with different length scales. The pores of the material can have a diameter within a range of greater than 2.5 nm to less than 100 nm. Foams, such as cellular polymers are characterized by 50-500 μm, or larger spherical pores. Foams can be prepared by gas being released by the liquid polymer, either by physical (boiling) or chemical reaction. Aerogels have an average pore size of a few nm to a few tens of nm wide, and can be prepared by gelation of a polymer in a solvent, and removal of the solvent by supercritical extraction. As a consequence, aerogel pores are non-spherical. The porous material can be produced from any organic or inorganic precursor or their combinations capable of forming a stable 3D network in a suitable solvent. The porous material can be prepared by any method known in the art for the desired morphology.

The porous material can be organic, inorganic, or hybrid material with surface hydrophilic groups, such as hydroxyl, carboxyl, carbonyl, epoxy, oxy or oxide groups. The porous material can include a hydrophilic ceramic, hydrophilic metal oxide, composites of hydrophilic metal oxides and another material, graphene oxide, reduced graphene oxide and mixtures thereof. Exemplary ceramics can include $Al_2O_3$, $TiO_2$, $ZrO_2$, ZnO, and $SiO_2$. Exemplary composites containing two or more materials include porous $TiO_2$—$SiO_2$ composites, $TiO_2$—$ZrO_2$ composites, and $Al_2O_3$—SiC composites, and metallic nanoparticle composites, such as Ag—$TiO_2$, and Zn—$CeO_2$, and zeolites. In some cases, the 3-dimensional hydrophilic framework is a reduced graphene oxide (rGO) based framework. For example, in some cases, the 3-dimensional hydrophilic framework comprises or consists of rGO.

The porous material can include a hydrophilic polymer having a cellular structure, e.g., a polymer sponge/foam/aerogel. For example, the hydrophilic polymer can include polyurethane, polyurea, polyurethane/polyurea, polyester polyurethane, and polyalkylene oxide, a biopolymer such as cellulose, alginate, chitin, chitosan, pectin, gelatin, collagen, carrageenan, hyaluronic acid, pectin, starch, and xanthan gum, a modified biopolymer, such as modified cellulose, or a combination thereof. The modified cellulose can be cellulose acetate, cellulose acetate propionate, and cellulose acetate butyrate. In some cases, the porous material can comprise or consist of cellulose acetate. In some cases, the Janus nanocomposite includes about 90-99% or 95-99% hydrophilic polymer by weight and 1-10% or 5-10% superhydrophobic component by weight.

The Janus composite can have any form. For example, the Janus composite can be a plurality of solids such as aggregates, granules, pellets, particles, or powder, or a larger molded solid. In some cases, the granular or particulate composites are combined with a binder to form a larger composite. The binder can be a polymeric or clay binder, for example.

One or more embodiments of the present disclosure includes supported Janus composites and supported Janus nanocomposites. For example, a Janus composite as described above can be supported in or on a membrane, such as a water purification membrane. The Janus composite can be adhered or otherwise applied to a substrate or filter device for oil-separation. In some cases, particles of a Janus composite or nanocomposite can be incorporated into a membrane-forming polymer solution and cast into a mixed matrix membrane. The polymer can be selected form the group consisting of cellulose acetate, polysulfone, polyethersulfone, polyimide, polyacrylonitrile, polyvinylalcohol, polypropylene, polytetrafluoroethylene, polyvinylidene fluoride, and copolymers thereof.

B. Janus Composite Articles of Manufacture

Embodiments of the present disclosure also feature oil-separating devices, sponges, filter devices and cartridges comprising a Janus composite or nanocomposite. An oil separating cartridge of the present disclosure can include a cartridge housing at least partially filled with a Janus nanocomposite, as described above. The cartridge housing can include (1) an inlet configured to receive an oil-in-water emulsion and allow the emulsion to flow over the Janus nanocomposite, and (2) an outlet positioned to ensure the de-oiled water can flow-through the Janus nanocomposite and out of the cartridge. The Janus nanocomposite can be in in the form of a fibrous sponge, a packed bed of granular material (e.g., forming a porous cake) or loose granules, pellets, particles, or powders. The housing can be configured to retain the Janus nanocomposite during storage and use. For example, the inlet and outlet can include water permeable filter devices that exclude passage of the nanocomposite and/or removable caps or other coverings. The housing can be configured to permit the Janus nanocomposite to be removed for recycling and reuse after an oil separation cycle. The housing can include a removable base to allow access to the housing interior and removal of the Janus nanocomposite with the trapped oil.

C. Oil Separating Systems Including Janus Composites.

One or more embodiments of the present disclosure features systems for separation of oil from oil-in-water emulsions including Janus composites, such as Janus nanocomposites. The system can include a vessel comprising a Janus nanocomposite, as described above. In some cases, the vessel includes one or more columns with the Janus nanocomposites (e.g., an oil-separating cartridge as described above). The vessel can be impermeable to water or permeable to water. For example, the vessel can include openings or have partially open walls.

The system can include an inlet conduit for receiving the oil-in-water emulsion in fluid connection with the vessel (include has partial open walls) comprising the Janus composite or nanocomposite. The inlet conduit can include a valve regulator to control the flow of the emulsion into the vessel. The inlet conduit can further include a feed pump to draw the emulsion from the source. In some cases, the system can further include one or more components configured to separate, remove, and/or collect any solids that are suspended in the emulsion before the emulsion flows into the vessel For example, the inlet conduit can include a mesh screen for removing sand or other solids.

In some cases, the system is configured to agitate the contents of the vessel. For example, the vessel can include a stirring bar or a recirculation loop. The recirculation loop can include a circulation pump. The system can be configured to control the speed and duration of the agitation automatically.

The vessel can include an outlet for discharging the de-oiled water of the emulsion from the vessel. The outlet can be in fluid connection with a storage tank for holding the de-oiled water.

During operation of the system, the emulsion (e.g., oil-contaminated water) is flowed through the inlet conduit and into the vessel containing the Janus composite or nanocomposite. The oil of the dispersed phase is trapped on the Janus composite or nanocomposite due to its hydrophobic (oleophilic) character, and the aqueous phase flows through the vessel to the outlet. The de-oiled water can be collected at the outlet. The flow can be gravity fed.

The system can separate the dispersed oil phase from the emulsion to provide de-oiled water having a final concentration of oil that lower than ppm level. In some cases, the final concentration of oil is lower than ppb level. The system can be configured to measure the oil content of the de-oiled water. For example, the outlet can include a spectrophotometer to measure the absorbance of the outflow. The efficiency of the system can be determined by measuring the rate of oil removal. In some cases, the system removes 50% or more of the oil in the emulsion (v/v) within 30 seconds, 80 v/v % or more within 60 seconds, 90 v/v % or more within 90 seconds, and 95 v/v % or more within 150 seconds.

The system can further include one or more components for purification of the oil-separated aqueous phase, such as components for removing one or more soluble contaminants such as salts or dissolved gases. Desalination systems and membrane filters systems can be incorporated into the system outlet.

The system can be a portable hand-held system, a benchtop system, or a large-scale high-performance water purification system.

D. Methods of Separating Oil from Emulsions Using Janus Composites.

One or more embodiments of the present disclosure feature a method of separating oil from an oil-in-water emulsion by contacting the emulsion with a Janus composite, as described above. The method can produce an oil fraction and a de-oiled water fraction from the emulsion.

The oil-in-water emulsion can be any emulsion requiring oil separation to meet the occupational safety or environmental requirements for re-use or disposal in the land or sea. The oil-in-water emulsion can be any emulsion comprising a continuous aqueous phase and a dispersed phase with an oil contaminant. The oil-in-water emulsion can be petroleum refinery wastewaters, produced water, flowback water from fracking operations, water from industrial cleaning, steel manufacturing, bilge and ballast water, food processing wastewater, agricultural wastewater and sewage effluent. The oil contaminant can include dissolved organic carbon (DOCs) such as hydrocarbons, polycyclic aromatic hydrocarbons (PAHs), organic acids, phenols, and volatiles.

Contacting can include adding the Janus composite to the emulsion or adding the emulsion to the Janus composite. In some cases, the contacting step includes agitating the emulsion with the Janus composite. For example, agitating can include mixing, stirring, and/or shaking for a predetermined period of time. Contacting can include allowing the agitated emulsion to rest for a predetermined period of time. Contacting can include flowing the emulsion over or through the Janus composite. For example, contacting can include flowing the emulsion through a supported Janus nanocomposite as described above, or an oil-separating cartridge comprising a Janus nanocomposite as described above.

The Janus composite adsorbs the oil and thereby demulsifies the oil contaminant, coalesces the de-emulsified oil contaminant, and separates the coalesced de-emulsified oil contaminant from the oil-in-water emulsion. The method is effective for separating oil present in dilute concentrations. For example, the concentration of oil in the emulsion can be about 100 to about 500 parts per million (ppm), or less (>1 ppb). The method efficiently removes oil from dilute oil in water emulsions. For example, the method can remove at least 70% by weight of the oil within 3 minutes. In some embodiments, the method achieves nearly complete oil removal (about 96-99% by weight) in 15 minutes or less. After the oil has been absorbed, the oil content of the emulsion can be less than 1 ppb or as specified.

The method of the present disclosure is effective for separating oil that is too small and too diluted to be efficiently removed by conventional methods (e.g., skimming, centrifugation, gravity settling). For example, the dispersed phase can have an average droplet size in a micron or sub-micron size. The dispersed phase can have an average droplet size of less than about 20 microns, less than about 10 microns, or less than about 5 microns and greater than 200 nm.

In some cases, the contacting step results in at least a portion of the oil fraction being trapped on the Janus composite. Trapped oil can break free of the Janus nanocomposite and float to the surface of the water. The liberated oil can form a large droplet of separated oil or a layer of separated oil which can be removed (e.g., by sparging, skimming, or absorbed) for use as a raw material or disposal.

The method of separating oil from an oil-in-water emulsion can further include removing the de-oiled water fraction from the Janus composite-trapped oil or from the floating oil layer. Removing the de-oiled water can include decanting the water fraction without disturbing the Janus composite-trapped oil, withdrawing the water fraction without disturbing any separated oil on top of the water, or a combination of these methods. Decanted or withdrawn water fraction can be subjected to further purification steps (e.g., desalination, heavy metal chelation, evaporation, distillation, membrane filtration, electric separation, and chemical treatments).

The method of separating oil from an oil-in-water emulsion optionally includes recycling the Janus composite. Physical and chemical methods of oil removal can be utilized. For example, recycling the Janus composite after it has absorbed oil can include reclaiming any oil trapped thereon. Reclaiming the oil can include heating the Janus composite to a temperature around the boiling point of the oil. In some cases, the oil vapor is condensed and collected for disposal or other use. The oil absorbing capacity of the Janus composite can be recharged/regenerated after use. The Janus composite can be treated with an alkaline aqueous solution (e.g., an aqueous solution with a pH of at least 9) followed by treatment with hydrogen peroxide. The regenerated Janus composite exhibits substantially the same oil removal efficiency as a freshly prepared composite. Thus, the Janus composites of the present disclosure possess excellent regeneration ability and recyclability.

E. Methods of Preparing Janus Composites.

The present disclosure also features methods of preparing a Janus composite including dispersing a hydrophobic nanoparticulate component on a 2- or 3-dimensional hydrophobic framework. The present disclosure also features methods of preparing a Janus nanocomposite including disposing a superhydrophobic nanoparticulate component on a 3-dimensional hydrophobic framework.

In one or more embodiments, the method can further include (a) making the hydrophobic or superhydrophobic nanoparticulate component (e.g., $MoS_2$ nanospheres) and/or (b) making the 2- or 3-dimensional hydrophilic framework; and (c) dispersing the nanoparticulate component on the framework.

The nanoparticulate component can be made using "bottom up" or "top down" approaches. A bottom-up approach can produce nanostructures with fewer defects, more homogenous chemical composition, and better short- and long-range ordering. When the Janus composite includes $MoS_2$ nanoparticles, such as the $MoS_2$ nanospheres described above, the method can include making the $MoS_2$ nanoparticles using a bottom-up approach. Alternatively or additionally, the method can include making the $MoS_2$ nanospheres using a top-down approach, such as exfoliation of layered bulk material (e.g., liquid exfoliation by ion intercalation and mechanical force, liquid exfoliation through oxidation, etching-assisted exfoliation).

Producing $MoS_2$ nanoparticles can include a hydrothermal process comprising combining a solution of molybdate and a sulfur source, such as L-cysteine or glutathione. The concentration of the molybdate can be about 0.002-0.03 M and the mole ratio of S to Mo can be 4:1 to 2:1. The pH can be adjusted to 1-7 with the addition of HCl. The mixture can be heated to about 180-220° C. for about 18-36 hours. The solution can be cooled naturally and the synthesized $MoS_2$ nanoparticles can be collected.

Methods of preparing single layer solids for embodiments featuring a 2-D framework are described in the literature. Making a 3-dimensional hydrophilic framework can include (b1) providing a framework precursor and (b2) forming a 3-dimensional hydrophilic framework from the precursor. Step (b) or (b2) and step (c) can be performed simultaneously. The addition of the hydrophobic or superhydrophobic nanoparticulate component can mediate self-assembly of the Janus nanocomposite and incorporate the nanoparticulate component into the 3-dimensional hydrophobic framework.

The resulting nanocomposite possesses physiochemical properties that are different from any individual components, allowing expanded capacities. Self-assembly strategies include hydrothermal reduction process, metal ion induced process and chemical reduction process. Sometimes, the framework precursor (e.g., graphene oxide monolayers) is contacted with the nanoparticulate component (e.g., $MoS_2$ nanospheres) under conditions for hydrothermal reduction, thereby producing the 3-dimensional hydrophilic framework of the Janus nanocomposite (e.g., MN-rGO). The resulting rGO framework can include hydrophilic monolayers interconnected through electrostatic interactions, $\pi$-$\pi$ stacking and hydrogen bonding.

A 3-dimensional rGO framework can be self-assembled from a rGO framework precursor. The rGO framework precursor can be prepared from graphene oxide (GO) (e.g., exfoliated GO monolayers). The method can include preparing GO. Suitable methods can utilize pure graphite powder to synthesize graphite oxide, which can be exfoliated to produce the GO.

A modified Hummers' method can be used to synthesize graphite oxide. The method can include adding graphite powder to a mixture of sulfuric acid ($H_2SO_4$) and phosphoric acid ($H_3PO_4$) under stirring conditions. The acid mixture can have a volume ratio of 9:1 $H_2SO_4$ to $H_3PO_4$. Potassium permanganate ($KMnO_4$) can then be added to the solution in a controlled manner. The mixture can be stirred until the solution becomes dark green, a color change indicative of the presence of graphite oxide particles (e.g., 4-10 hours). Excess $KMnO_4$, can be eliminated with hydrogen peroxide ($H_2O_2$). For example, $H_2O_2$ can be dropped slowly and the solution stirred for about 10 minutes to eliminate excess $KMnO_4$, Graphite oxide particles can then be exfoliated to produce layers of graphene oxide (GO). Exfoliation can be achieved by sonicating, homogenizing, microfluidizing, or ball milling. GO layers can also be prepared using thermal or microwave exfoliation. The exfoliated GO layers, such as GO monolayers, can have an average flake size of 0.5-1.0 micron.

In one or more embodiments, the method includes a hydrothermal step for self-assembly of a Janus nanocomposite. For example, the hydrothermal step can be performed in parallel with or after the hydrophilic framework precursor is treated with the superhydrophobic nanoparticulate component. Generally, the hydrothermal step includes heating an aqueous dispersion of the hydrophilic framework precursor to a temperature within a range of 100 to 200° C. The temperature can be maintained for a duration of about 2 to 36 hours, or until a hydrogel is obtained. The hydrogel can be subjected to a drying step to provide the Janus nanocomposite.

In one or more embodiments, the Janus composite is prepared by dispersing the hydrophobic or superhydrophobic nanoparticle component in a polymer solution composed of a hydrophilic polymer dissolved in a solvent, removing the solvent to induce phase separation or coagulation (e.g., by solvent exchange), and drying the product to produce the porous hydrophilic framework comprising the nanoparticles. The polymer solution having nanoparticles dispersed therein can be poured into a mold before introduction of a non-solvent.

F. Uses of Janus Composites.

One or more embodiments of the present disclosure feature using the Janus composites described above to prepare of articles of manufacture such as by partially or fully packing composite into a structure; such as cartridge, sponge or a device; or to prepare compositions. For example, Janus composites can used to prepare a composition by freely dispersing particles comprising a Janus composite in a liquid or in an oil-in-water emulsion.

Embodiments of the present disclosure also feature using the Janus composites to separate oil from an oil-in-water emulsion by contacting the emulsion with a Janus composite, as described above. The method can produce an oil fraction and a de-oiled water fraction from the emulsion.

Examples

Ex. 1: Materials No 1: Amphiphilic Janus 3D $MoS_2$/rGO nanocomposite for removing oil from wastewater.

INTRODUCTION

Figure 1B:
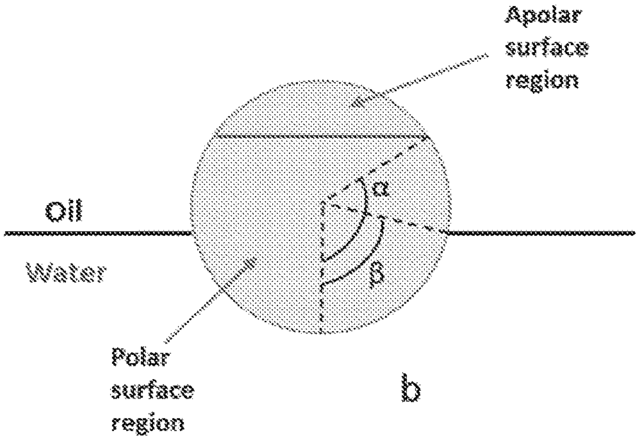
FIG. 1B (Prior Art)

This example describes a promising solution for efficient oil/water separation through tailor designed nanoparticles with "Janus" property of two surface regions of different wettability. Different from the particles with uniform wettability, the Janus particles have inhomogeneous wettability, i.e., polar and apolar. The ratio of both areas can be varied depending on the two contact angles α, and β (e.g., see FIG. 1B) so that the particles can be tailored for efficient separation of oil contaminants in different produced water compositions. The normal homogeneous nanomaterials are surface active at the water-oil interface, but are not oleophilic (or amphiphilic in biology), whereas the Janus nanomaterials are not only surface active, but also are hydrophobic/oleophilic. This special property of Janus particles is advantageous for trapping a large number of fine oil droplets to make them coalesce.

For this example, the underlying Janus structure formation depends on the creation of multiple inorganic interfaces between chemically and structurally different materials. When a secondary material is coated on the existing seed substrate of a different material, the total Gibbs free energy change, AGs will dictate the system growth:

$$\Delta Gs=\gamma_1-\gamma_2+\gamma_{1,2} \quad (1)$$

where $\gamma_1$ and $\gamma_2$ are the surface energies associated with each material, $\gamma_{1,2}$ is the solid/solid interfacial energy. The factors affecting $\gamma_1$ and $\gamma_2$ can be species such as surfactants, ligands, and monomers, whereas the $\gamma_{1,2}$ reflects the crystallographic compatibility of lattices. The combination of these factors can dictate the deposition and growth mode of Janus nanocrystals.

Figure 2:
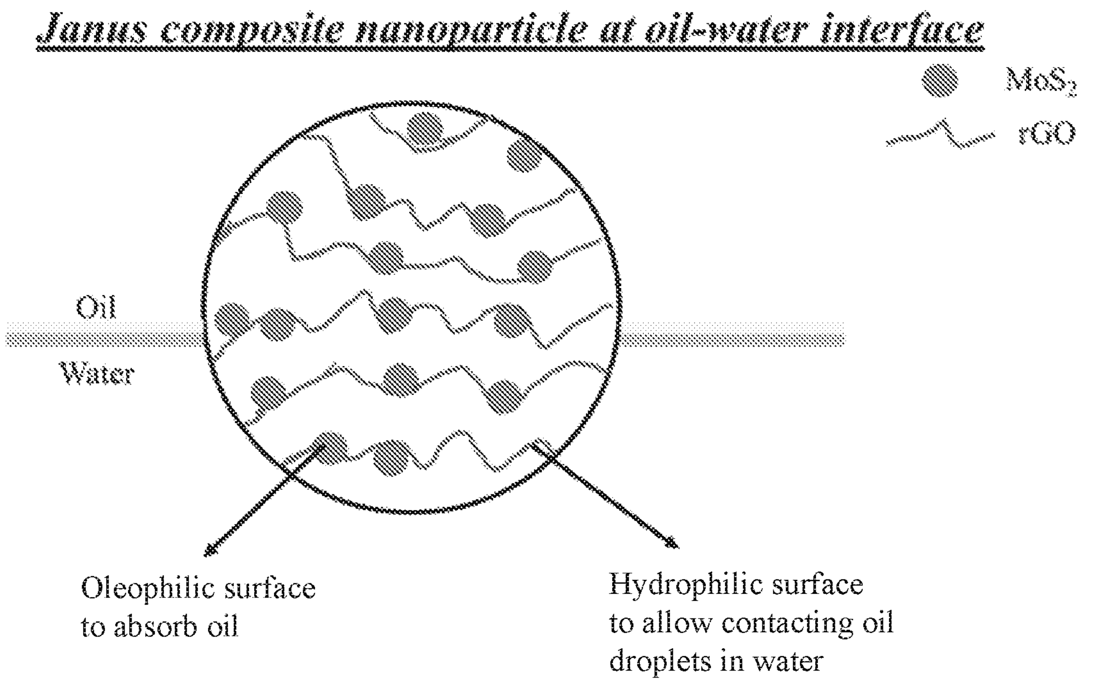
FIG. 2 is an illustration of the concept of a Janus composite nanoparticle for oil/water separation, according to one or more embodiments of the present disclosure.

Until now, majority of the Janus particle research is related to the self-assembly of block co-polymer and organic ligands or masking by polymers, only few reports of the preparation of multiple component heterodimers type of inorganic Janus particles, and no report is available on Janus nanocomposite with hydrophobic/hydrophilic dual properties. In the present example, the design and synthesis of a $MoS_2$/rGO nanocomposite particle is described. The combined effects of its superhydrophobic $MoS_2$ component and more hydrophilic rGO component offer a unique Janus property (FIG. 2). The nanocomposite is used to separate micro-sized oil droplets from an oil-in-water emulsion, which represents the similar property of oil produced water. The experimental results validate the concept, and confirm that a Janus $MoS_2$/rGO nanocomposite (MN-rGO) achieves efficient fine oil droplets collection and separation from water.

Methodology

First, $MoS_2$ nanospheres synthesis: superhydrophobic $MoS_2$ nanospheres were prepared from "bottom up" method by hydrothermal synthesis from sodium molybdate salt and L-cysteine under acidic condition. Detailed method is as below: L-cysteine is dissolved in 10 ml water to form a first solution (1), HCl is added dropwise to (1) and stirring to form a second solution (2). In a separate container, sodium molybdate dehydrate was added to water until dissolved to form a third solution (3). Solution (3) was added dropwise to (2) while stirring to form solution (4), stirred for 30 min, which is then transferred the solution to autoclave for hydrothermal process at 200° C. for 30 hours. The solids of $MoS_2$ were separated from the liquid and washed by water and ethanol alternatively several times.

Second, GO nanosheets synthesis: GO was prepared by following a modified Hummers method. To describe the process briefly, 0.5 g graphite was oxidized using a mixture of concentrated sulfuric acid and potassium permanganate ($KMnO_4$). A solution of 1M of $H_2O_2$ was added into the solution, to react with the excess $KMnO_4$ completely. The obtained dispersion was washed with HCl aqueous solution (1:10 in volume) and deionized water several times in a filtration process. Finally, the obtained GO was then dispersed in a specific amount of DI water, depending on the required concentrations, followed with a 1 h sonication. The exfoliated monolayers had an average flake size of 0.5-1.0 micron.

Third, synthesis $MoS_2$/rGO nanocomposite with Janus property: the $MoS_2$ nanosphere dispersion was mixed with GO dispersion (2 mg/ml concentration) prepared above, the mixture then underwent self-assembly in a hydrothermal process at 140° C. for 12 hours to form a black-colored sponge-like structure of $MoS_2$ nanospheres and 3-dimensional reduced graphene oxide (MN-rGO).

Figure 3A:
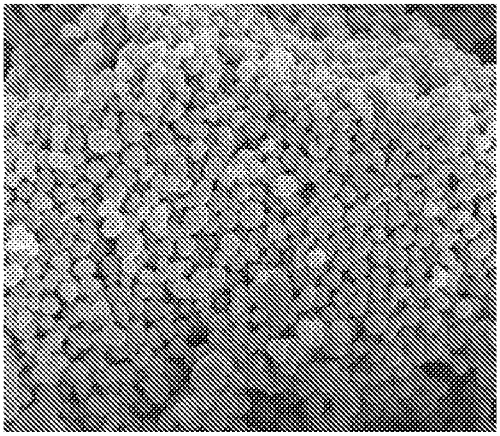
FIGS. 3A-D show SEM images of: $MoS_2$ nanospheres (A and B); top view of a $MoS_2$ nanospheres and 3-dimensional reduced graphene oxide (MN-rGO) nanocomposite (C), and cross-sectional view of the MN-rGO composite (D), each view according to one or more embodiments of the present disclosure.
Figure 3B:
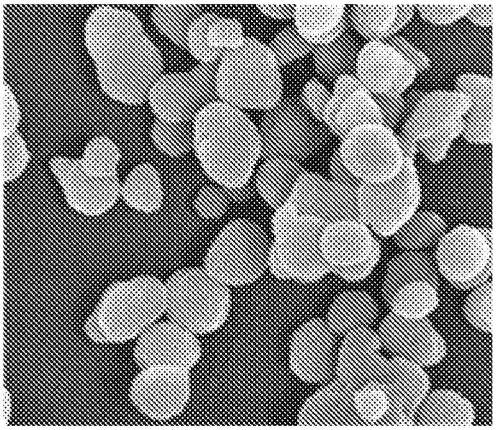
Figure 3C:
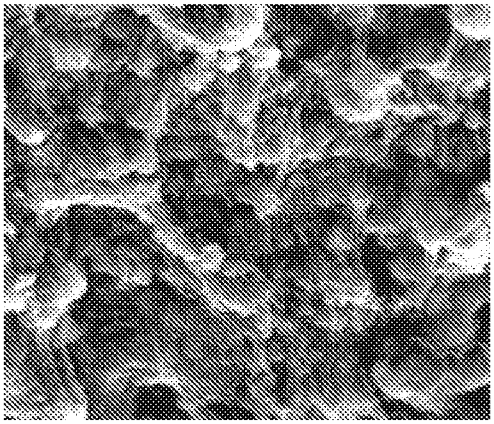
Figure 3D:
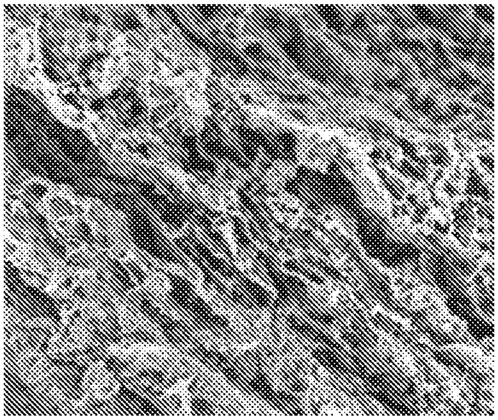

Results and Discussion $MoS_2$ nanospheres and 3D reduced graphene oxide composite (MN-rGO) were examined by SEM (FIG. 2) for their micro- and nano-structure. It can be seen that $MoS_2$ nanospheres were successfully synthesized by hydrothermal process (FIGS. 3A and B), their average size is in the range of 100-150 nm. The SEM images confirmed that MN-rGO nanocomposite has a uniform distribution of $MoS_2$ across the interconnected 3D rGO framework (FIGS. 3C and D).

Figure 4:
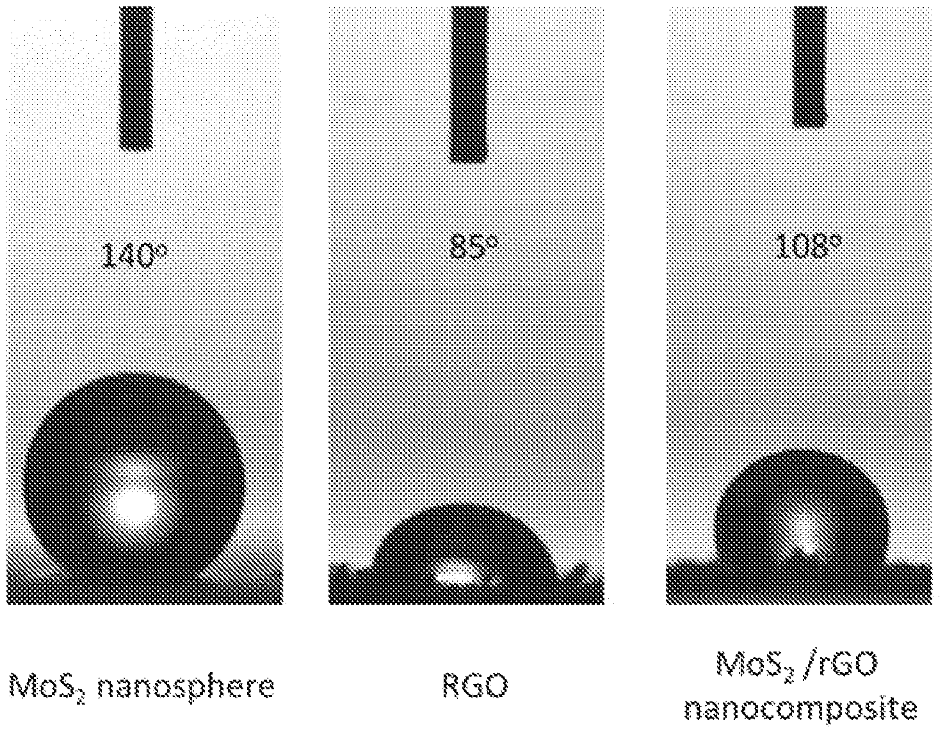
FIG. 4 shows net surface wettability of a MN-rGO composite, according to one or more embodiments of the present disclosure and the individual components ($MoS_2$ nanospheres and reduced graphene oxide (RGO)); measured by water contact angles.

The important surface wettability of the MN-rGO and the individual components ($MoS_2$ and rGO) were measured by water contact angle method. As shown in FIG. 4, the $MoS_2$ component offers superhydrophobic property with a water contact angle of 140°, whereas rGO component demonstrated more hydrophilic property with a water contact angle of 85°, the MN-rGO composite has the co-existence of hydrophobic and hydrophilic components as so-called Janus particles. The overall MN-rGO composite reached a net water contact angle of 108°.

Figure 5A:
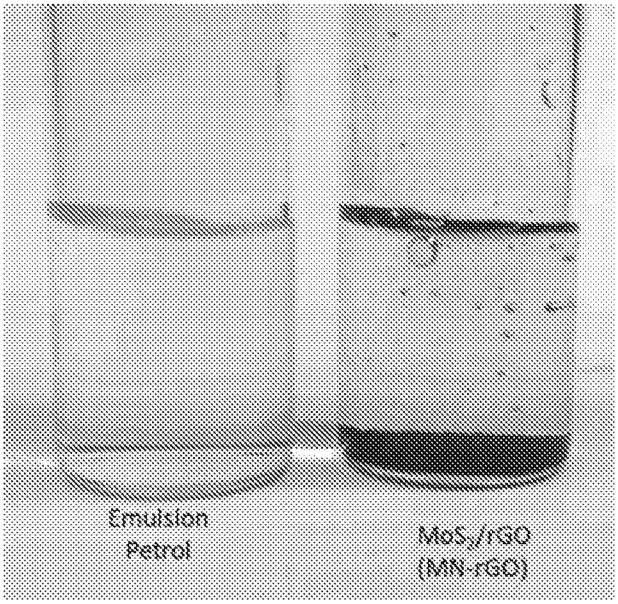
FIGS. 5A-B show separation of oil from petroleum water emulsions using a MN-rGO composite (A) and the individual components ($MoS_2$ nanospheres and RGO) (B), each view according to one or more embodiments of the present disclosure.
Figure 5B:
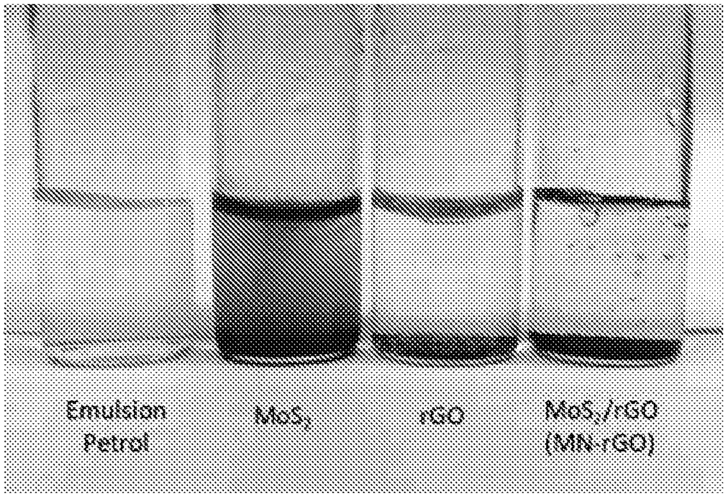

An oil-in-water emulsion was prepared by mixing 1v/v % petroleum liquid in water, followed by sonication to form the whitish colored oil in water emulsion. 1 mg of $MoS_2$, rGO and MN-rGO powder was added in three separate emulsion (3 ml vials), respectively. It can be seen in FIG. 5A that after shaking and resting, the emulsion treated by MN-rGO became completely clear and transparent, suggesting that fine oil droplets distributed in the emulsion were effectively collected and separated from water by the MN-rGO composite; whereas the emulsion treated by $MoS_2$ only and by rGO only still remained as whitish cloudy emulsion, indicating that the oil droplets have not been separated from water (FIG. 5B). The above experiments confirmed that the $MoS_2$/rGO nanocomposite possessed dual effects of superhydrophobic $MoS_2$ and hydrophilic rGO component and offered a unique Janus property that works well in collecting and separating fine oil droplets from petroleum in water emulsion. This MN-rGO nanocomposite has a great potential for treating industrial produced water and other oil contaminated water emulsion efficiently.

Figure 6:
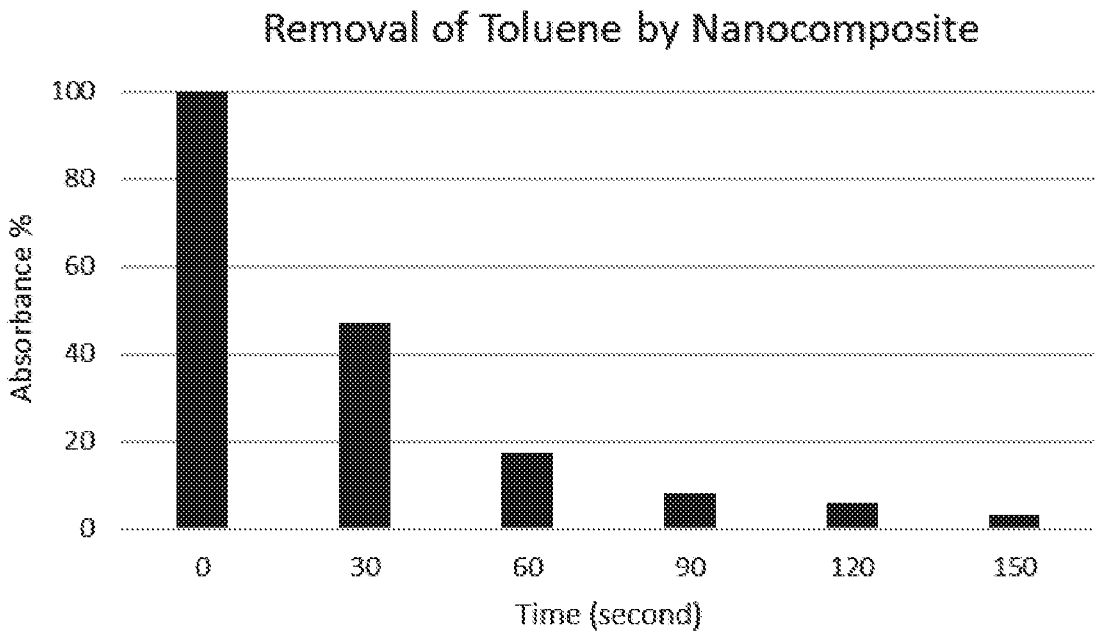
FIG. 6 is a histogram showing removal of toluene from water by a MN-rGO composite according to one or more embodiments of the present disclosure, over time.

Quantitative oil/hydrocarbon and water removal experiments were conducted by adding the MN-rGO in the toluene and water mixture (20 ml), mixing on electrical stirrer for 30 seconds. Liquid samples were then taken at different time intervals and analyzed by UV-Vis Spectrometer at scan wavelength of 200-300 nm. The results of toluene concentration vs time are plotted in FIG. 6. It is found that, after initial mixing, excellent toluene removal of 96.8% was achieved within 3 min (150 seconds).

Ex. 2: Materials No. 1: Amphiphilic Janus 3D $MoS_2$/rGO nanocomposite for removing oil from wastewater.

INTRODUCTION

With the increased energy demand in the world, the exploration and production of oil and natural gas will be continuously a significant part of the energy production. Crude oil is commonly produced together with water. As so-called produced water to oil ratio is 5:1 or higher, approximately 250 million barrels of water are produced every day from oil and gas extraction operations. The typical oil and gas produced water is a complex mixture of organic and inorganic constituents, containing oil droplets in dissolved and dispersed form and many other trace compounds. The quality of the produced water varies greatly from case to case, and it often contains few hundred parts per million (ppm, mg/L) of dispersed oil droplets and dissolved organic carbons (DOCs) such as hydrocarbons, both are likely contributors to the adverse environmental impact and increase of the unit cost of oil production.

The conventional produced water management technologies include membrane filtration, biological aerated filters, hydrocylones, gas floatation, evaporation pond, adsorption, media filtration, ion exchange technology, chemical oxidation, electrodialysis, freeze-thaw evaporation, polymer extraction and electrochemistry. At present, these technologies offer less than ideal efficiencies, relatively high cost, associated fouling problem and secondary waste generation. Since the oil droplets and hydrocarbons could be in very small size, i.e., less than 20 μm, and highly stable in water with low settling velocities, they have little chance to be settled by gravity, so they are extremely hard to be removed efficiently from water.

A nanotechnology approach has been employed to design and fabricate nanomaterials with specific wettability. Recently, membranes of specific wettability that only allows either oil or water phase to pass, and porous sponges which selectively absorb oil or water into their empty voids are employed for selective removal of floating and surfactant stabilized oil droplets with improved separation efficiency. Most of the nanomaterials developed for oil in water separation often have the homogeneous superhydrophobic and superoleophilic properties, aim to maximize the oil adsorption at the oil and water interface, for example superhydrophobic and superoleophilic miniature device, superoleophilic microcrystalline cellulose (MCC) and methyl cellulose (MC) sponge, and highly oleophilic sponge by polymerization of polypyrrole followed by modification with palmitic acid. These reported material structures work well for cleaning the oil spill site by floating on the water surface, where oil concentration and volume are both high. However, such homogenous wettability faces a challenge in case of removing trace level of fine oil droplets from large volume of water, as their strong water repelling property (hydrophobicity) prevents them from intimately contacting the highly dispersed oil droplets across the entire aqueous phase. So, the separation of fine oil droplets from produced water remains a substantial challenge. Therefore, making breakthrough innovation in removal of fine oil droplets and other trace hydrocarbons from produced water is critically important to the petroleum industry and environmental authority globally.

"Janus Particles" i.e., particles that are amphiphilic with two distinct physical or chemical properties. Different from the particles with homogeneous wettability, the Janus particles offer heterogeneous wettability, such as hydrophilic and hydrophobic simultaneously. These particles have intrinsic larger size than isotropic particles which allow them for easy separation and recovery and still remain more stable at interface than molecular surfactants. In oil-in-water emulsion, the normal surface homogeneous particles are surface active at the water-oil interface, but are not oleophilic, whereas the Janus particles are not only surface active, but also are oleophilic. This special property of Janus particles could be advantageous for trapping a large number of fine oil droplets to make them coalesce. Until now, the majority of the Janus particle research is related to the self-assembly of block co-polymer and organic ligands or masking by polymers, and only few research reported the applications of Janus particles in separating oil from water, for example, inorganic silica/$Fe_3O_4$ Janus nanosheets have been prepared by a self-assembled sol-gel process at an emulsion interface to form a shell, followed by crushing the corresponding parent Janus hollow spheres and reported to be used for spilled oil separation. The materials' synthesis and application were limited by many factors such as varying of chemical conditions at interfacial assembly, random size and thickness by mechanical crushing, and lack of sufficient surface area for adsorption. New strategies of mass-fabricating the Janus materials needs to be developed. Molybdenum disulfide ($MoS_2$) is a transition metal dichalcogenide (TMD) layer compound, $MoS_2$ materials with different wettability can be synthesized by either top-down approach of exfoliation or bottom-up approach by chemical synthesis.

Figure 7A:
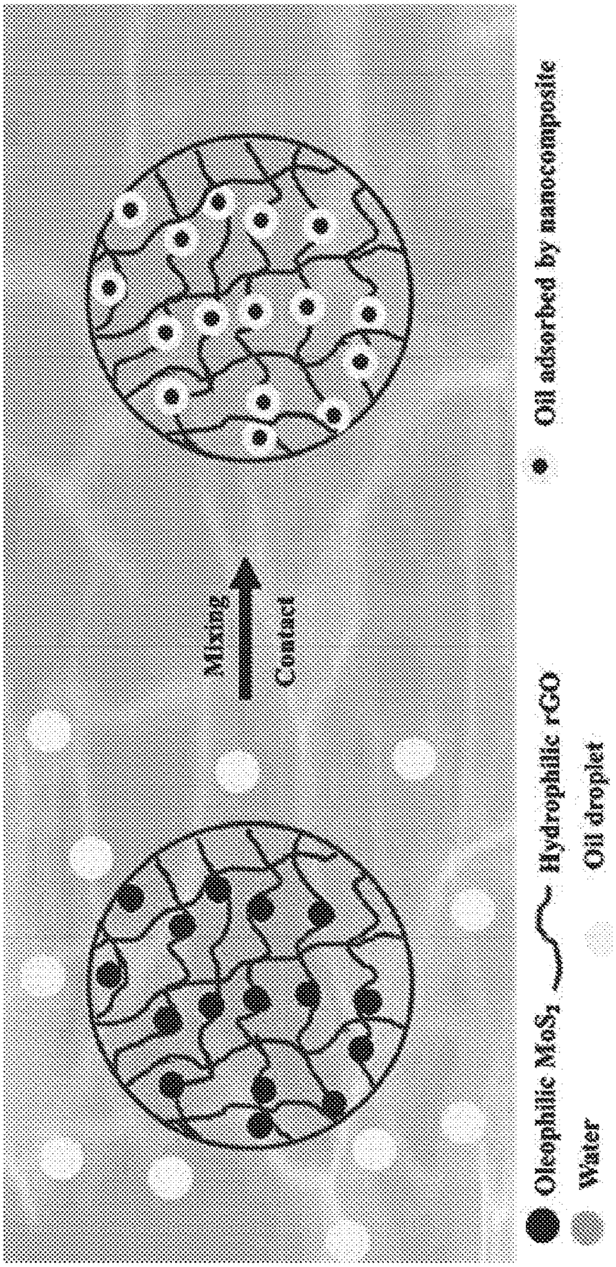
FIGS. 7A-C depict (A) an illustration of 3D $MoS_2$/rGO nanocomposite with Janus type structure, according to one or more embodiments of the present disclosure; (B) a synthesis process of the 3D $MoS_2$/rGO nanocomposite with Janus type structure; and (C) an illustration of the amphiphilic Janus particle at oil-water interface.
Figure 7B:
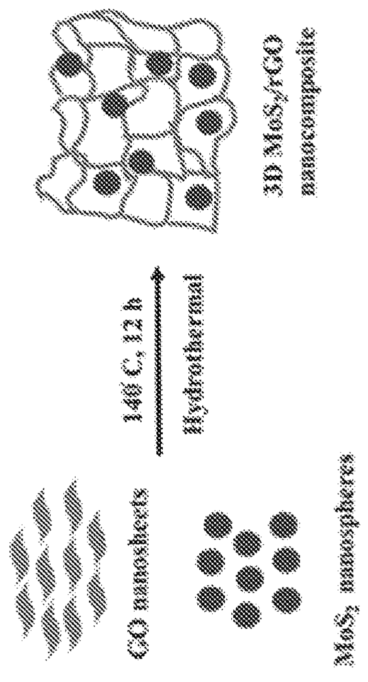

This example describes a facile and green method to assemble a Janus 3D $MoS_2$/rGO nanocomposite (FIG. 7A)

i.e., amphiphilic with both oleophilic and hydrophilic regions, by a two-step hydrothermal synthesis process as illustrated in FIG. 7B. The synthesized nanocomposite with Janus surface properties is characterized by systematic characterization and experimental evaluations. This Janus nanocomposite has been evaluated by qualitative and quantitative adsorption experiments, and manifests an excellent ability to remove fine oil droplets from water.

Materials and Methods

Materials

All chemicals including L-Cysteine, sodium molybdate dihydrate, hydrochloric acid, graphite, flakes, potassium permanganate, sulfuric acid, sodium nitrite, hydrogen peroxide, were purchased from Sigma Aldrich. Deionized (DI) water was used in all experimental processes.

Synthesis

2.1. Synthesis of $MoS_2$

To synthesize the $MoS_2$ nanospheres, 0.605 g of L-cysteine was dissolved in 10 ml of water, 5 ml of 10% HCl was added dropwise and followed by stirring as solution (1). Then, 0.29 g of sodium molybdate dihydrate was dissolved in water and was added dropwise to solution (1) and the mixture was stirred for 30 mins to form solution (2). This solution was autoclaved at 200° C. for 30 hours. After hydrothermal reaction, the as prepared $MoS_2$ nanospheres were washed alternately with DI water and ethanol five times and were diluted as per requirement.

2.2. Synthesis of GO Nanosheets

Graphene oxide of 2 mg/ml concentration was synthesized in the lab according to modified Hummer method as reported previously. In short, 1 g of graphite powder was added to concentrated sulfuric acid in ice bath and then added 0.5 g sodium nitrite, 6 g of $KMnO_4$, the mixture was stirred in ice bath for 45 mins and then stirred at 35° C. for 2 h. Next, the mixture was slowly diluted with 125 ml of DI water in ice bath and stirred at room temperature for 2 h. After the mixture was further diluted with 250 ml DI water, 20 ml of 30% $H_2O_2$ was added until the mixture turned to bright yellow and bubbled. Finally, the mixture was filtered and washed with aqueous HCl solution (1:10 by volume) to remove residual metal ions, and washed with DI water until the pH reached 7. The yellow-brown GO slurry was collected by vacuum filtration and re-dispersed in DI water to form a suspension of 2 mg/ml concentration.

2.3. Synthesis of 3D $MoS_2$/rGO Nanocomposite 40 ml of GO dispersion (2 mg/ml concentration) prepared by above procedures was sonicated for 20 min, and combined with 12.5 mg of $MoS_2$ nanosphere dispersion, the mixture was sonicated for 20 min, then was transferred into a sealed Teflon-lined autoclave and placed in the oven for hydrothermal reaction at 140° C. for 12 h. Finally, the product 3D rGO-$MoS_2$ nanocomposite was washed with DI water three times, and then dried under vacuum for 2 h.

Characterization

The synthesized $MoS_2$/rGO nanocomposites were characterized using Scanning Electron Microscopy (SEM, Quanta 250, FEI Company) with EDX and Transmission Electron Microscopy (TEM, Tecnai from FEITM Company operating at 200 KV) for samples' morphology, nanostructure and elemental compositions. Water and oil contact angle measurements were conducted with a DMo 701 Contact Angle Meter (Kyowa Interface Science, Japan) with interface Measurement & Analyses System and the droplets volume of 0.8 μl, where n-hexane was used as working liquid in the oil contact angle experiment. The specific surface areas, pore size distribution and total pore volumes of $MoS_2$/rGO nanocomposite, $MoS_2$ nanospheres and 3D rGO were determined quantitatively via BET and BJH methods by using a Belsorb Max (Japan), respectively. Raman spectra of the samples were measured in Horiba Raman Spectrometer with 633 nm laser source. X-ray diffraction (XRD) measurements of the $MoS_2$ nanospheres was carried out using a PANALYTICAL RAYONS-X XRD spectrometer with a Cu Kα radiation and scanned from 20 to 80°.

Experiments on Removal of Oil Droplets from Oil/Water Emulsion

Oil in water emulsions were prepared by adding 30 μL of toluene to 30 ml water (1% v/v, ~87 mg/L), and were stirred at 750 rpm for 30 mins. 10 mg of $MoS_2$/rGO nanocomposite, $MoS_2$ nanospheres, and 3D rGO were added to three separate emulsions and all three emulsions were stirred for 3 min. 2 mL of emulsion samples were taken at 30 second time interval, i.e., at 30, 60, 90, 120, 150, and 180 seconds, respectively, to quantitatively determine the amount of toluene at different time of the experiment by UV-vis spectrometer (PerkinElmer Lambda 35). At the end of the experiment, the spent $MoS_2$/rGO nanocomposite was collected by filtration with membrane of 0.45 μm pore size and was re-dispersed in 20 ml of water. The regeneration of the samples was carried out by adjusting the pH to 10, followed by adding $H_2O_2$ with stirring. The regenerated nanocomposite was dried and retested following the same experimental procedure. In addition, a petroleum water emulsion (1% v/v) was also prepared for visually observing the effect of separation of oil droplets from water by $MoS_2$/rGO nanocomposites.

Results and Discussion

3D $MoS_2$/rGO Nanocomposite with Amphiphilic Janus Structure

The synthesis of Janus $MoS_2$/rGO nanocomposite is illustrated in FIG. 7B. 12.5 mg of $MoS_2$ nanospheres prepared by green synthesis scheme was added to the 40 ml of GO solution (2 mg/mL) prepared by modified Hummers method followed by sonication, during which the $MoS_2$ nanospheres and GO sheets were thoroughly mixed with intimate contact of each other. During hydrothermal treatment at 140° C., the dispersion was subjected to self-assembly driven by π-π stacking and van der Waals forces that broke the surface force balance and resulted in forming the three dimensional sponge like structure of $MoS_2$ nanospheres embedded within 3D reduced graphene oxide framework, of which possessed the amphiphilic Janus property. Based on the results of running a separate GO sample under the same hydrothermal and drying process, the obtained nanocomposite is approximately 23 wt % of $MoS_2$ and 77 wt % of rGO.

Figure 8A:
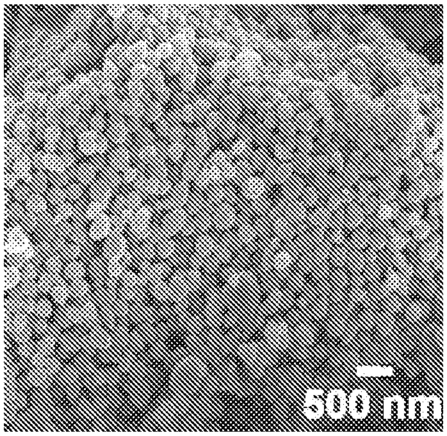
FIGS. 8A-E show (A) an SEM image of $MoS_2$ nanospheres and (B-C) TEM images of an individual $MoS_2$ nanosphere and close-up on the wall of $MoS_2$ nanosphere); SEM images of Janus $MoS_2$/rGO nanocomposite according to one or more embodiments of the present disclosure with (D) providing a top view and (E) a cross-sectional view (inset shows the corresponding EDAX spectrum of Janus $MoS_2$/rGO nanocomposite where M represents Molybdenum).
Figure 8B:
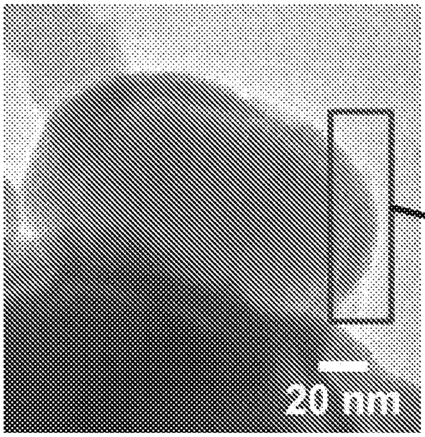
Figure 8C:
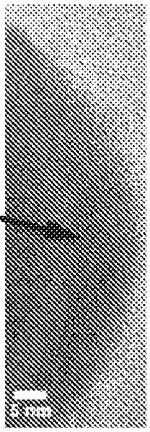
Figure 8D:
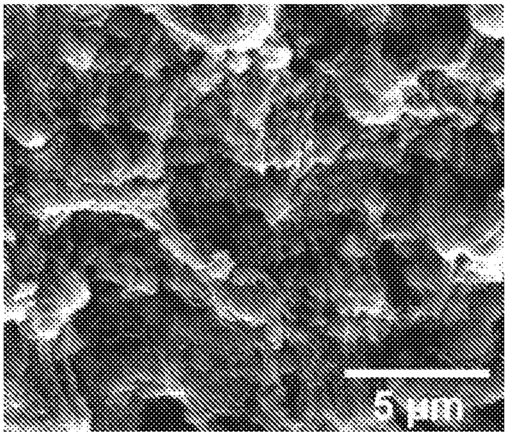
Figure 8E:
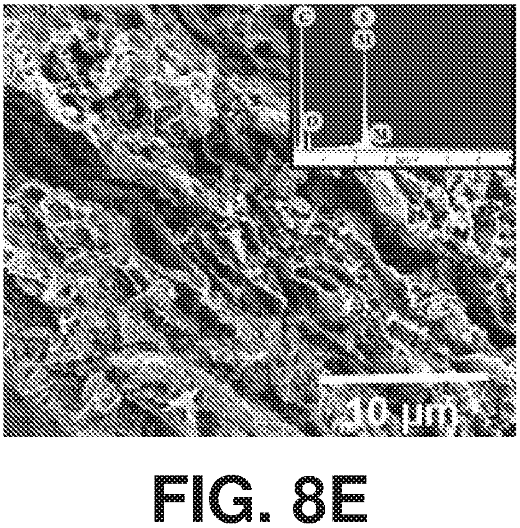

The surface morphology of $MoS_2$ nanospheres $MoS_2$/rGO nanocomposite and their cross-sectional view are portrayed in FIG. 8A confirms the synthesized $MoS_2$ particles have spherical shape with nearly uniform size with an approximately 200 nm diameter. The close observations by TEM in FIGS. 8B and 8C, suggest that $MoS_2$ nanospheres have a hollow structure and wall thickness of individual sphere is visible (FIG. 8C), in addition, the diffraction planes of the wall region of the nanosphere also confirms some crystallinity. In case of $MoS_2$/rGO nanocomposite, the SEM image (FIG. 8D) illustrates the uniform distribution of $MoS_2$ nanospheres across the entire 3D rGO structure. The cross-sectional view in FIG. 8E reveals the $MoS_2$ nanospheres are embedded within the porous 3D rGO framework. The inset in FIG. 8E shows the EDX spectrum of Janus $MoS_2$/rGO nanocomposite which contains the elements namely C, O, Mo and S and confirming the presence of rGO and $MoS_2$.

Figure 9A:
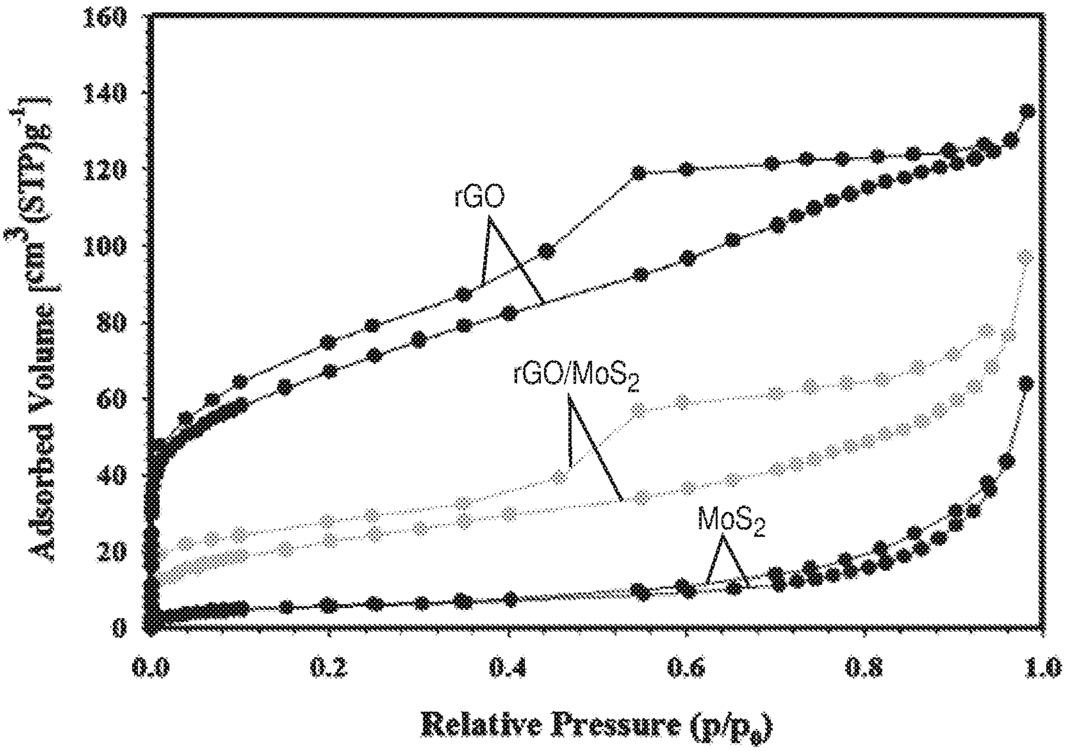
FIGS. 9A-B provide (A) specific surface area of $MoS_2$/rGO nanocomposite, $MoS_2$ and rGO samples from $N_2$ adsorption/desorption isotherms based on BET method; and (B) pore size distribution of $MoS_2$/rGO nanocomposite, $MoS_2$ and rGO samples based on BJH method.
Figure 9B:
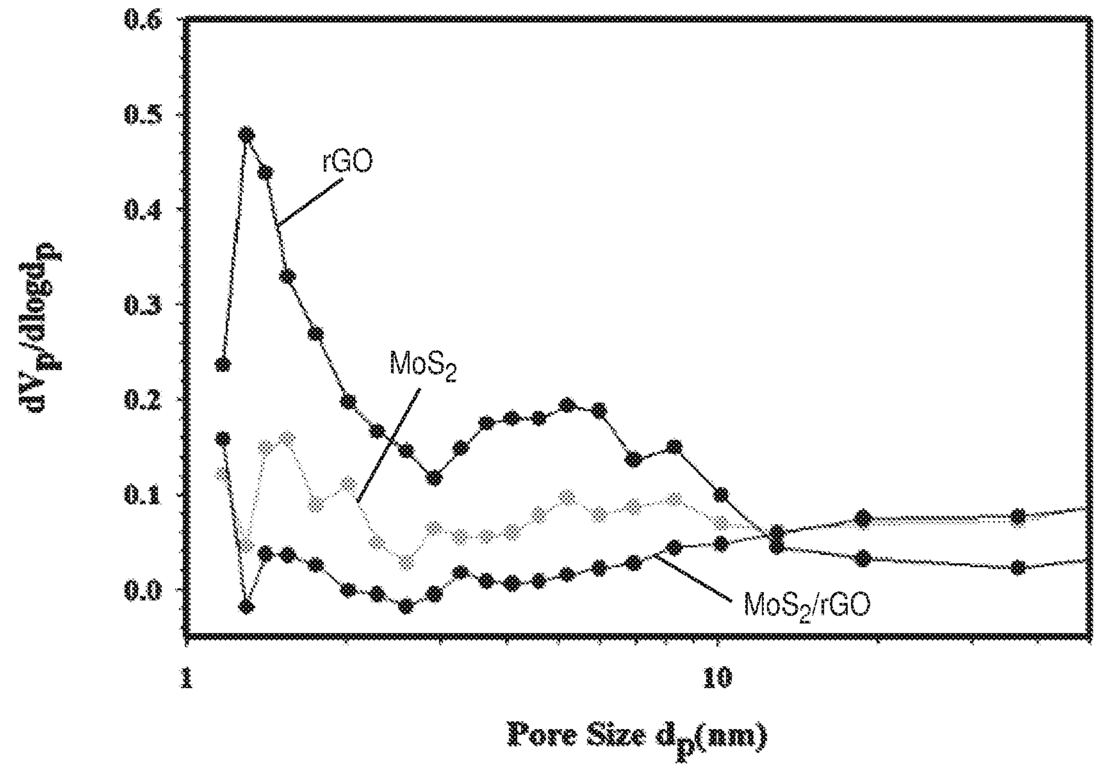

The specific surface area of $MoS_2$/rGO nanocomposite, $MoS_2$ and rGO samples determined by Brunaur-Emmett-Teller (BET) method using $N_2$ adsorption/desorption isotherms are 82, 23, 235 $m^2/g$, respectively as shown in FIG. 9A. The higher specific surface area of rGO is resulted from the transformation of well dispersed few layers of GO nanosheets into highly porous 3D sponge structure; the lowest specific surface area of $MoS_2$ nanospheres confirms its smooth and dense morphology. It can be seen that the structure of $MoS_2$/rGO nanocomposite become more packed with co-existing of dense $MoS_2$ nanospheres and porous 3D rGO sponge, this is evidenced by nanocomposite's medium level of specific surface area. The plots of pore size distribution calculated by the Barrett-Joyner-Halenda (BJH) method is shown in FIG. 9B. It can be seen that embedded $MoS_2$ nanospheres have significantly reduced amount of very small micropores (<2 nm) within the porous 3D rGO structure, while maintaining a good amount of mesopores (2-50 nm) at the resultant nanocomposite structure. As a result, although the BET specific surface area of nanocomposite is lower than 3D porous rGO sponge, majority of its pores are mesopores with an average pore diameter of 4.13 nm which is greater than 3D porous rGO of 2.59 nm only. The mesopores at $MoS_2$/rGO nanocomposite are suitable to accommodate the adsorbate molecules, and provide more accessible effective working surface; on the other hand, porous 3D rGO sponges have a lot of tiny micropores that contribute to the total specific surface area but are too small to be accessible for adsorbate molecules.

Figure 15:
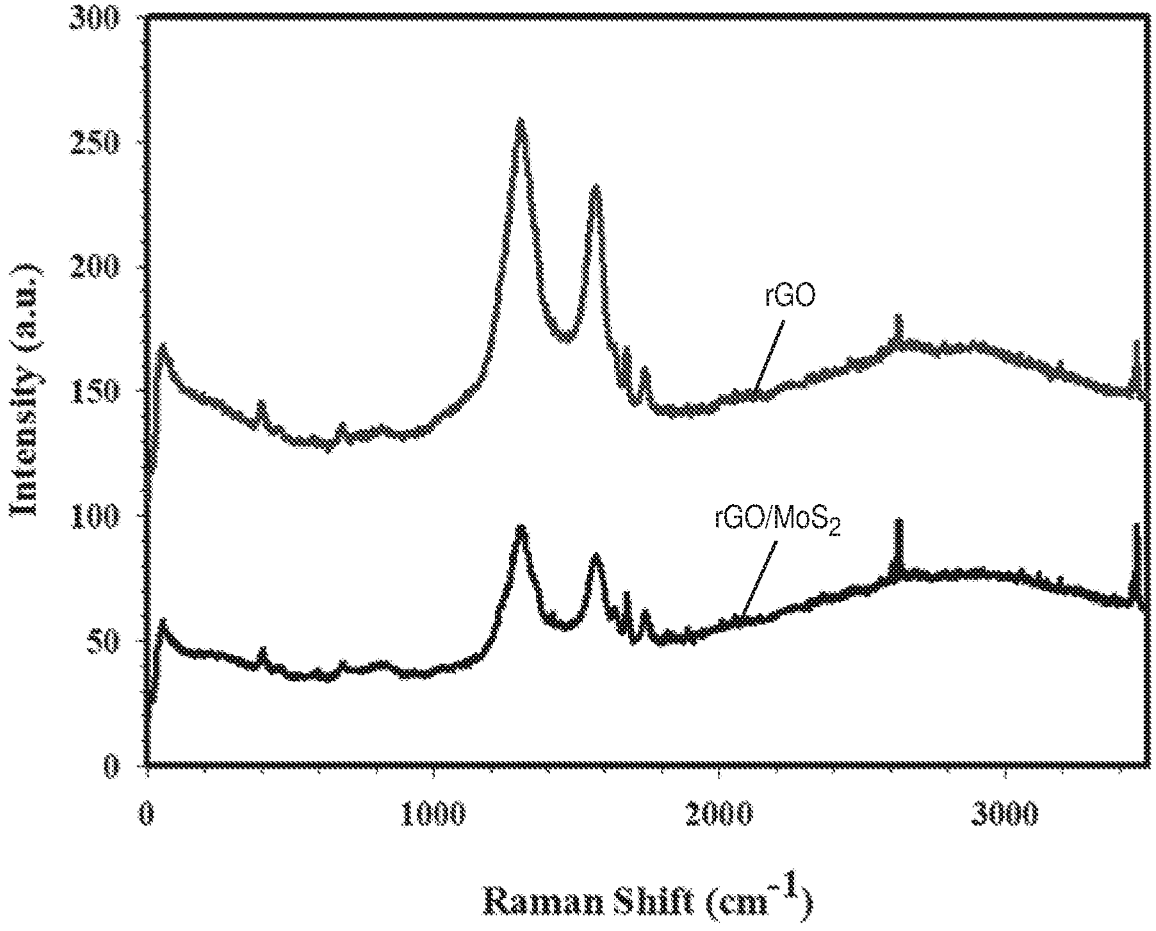
FIG. 15 shows Raman spectra of a $MoS_2$/rGO nanocomposite (lower) and rGO (upper) samples, according to one or more embodiments of the present disclosure, with 633 nm laser source.
Figure 16:
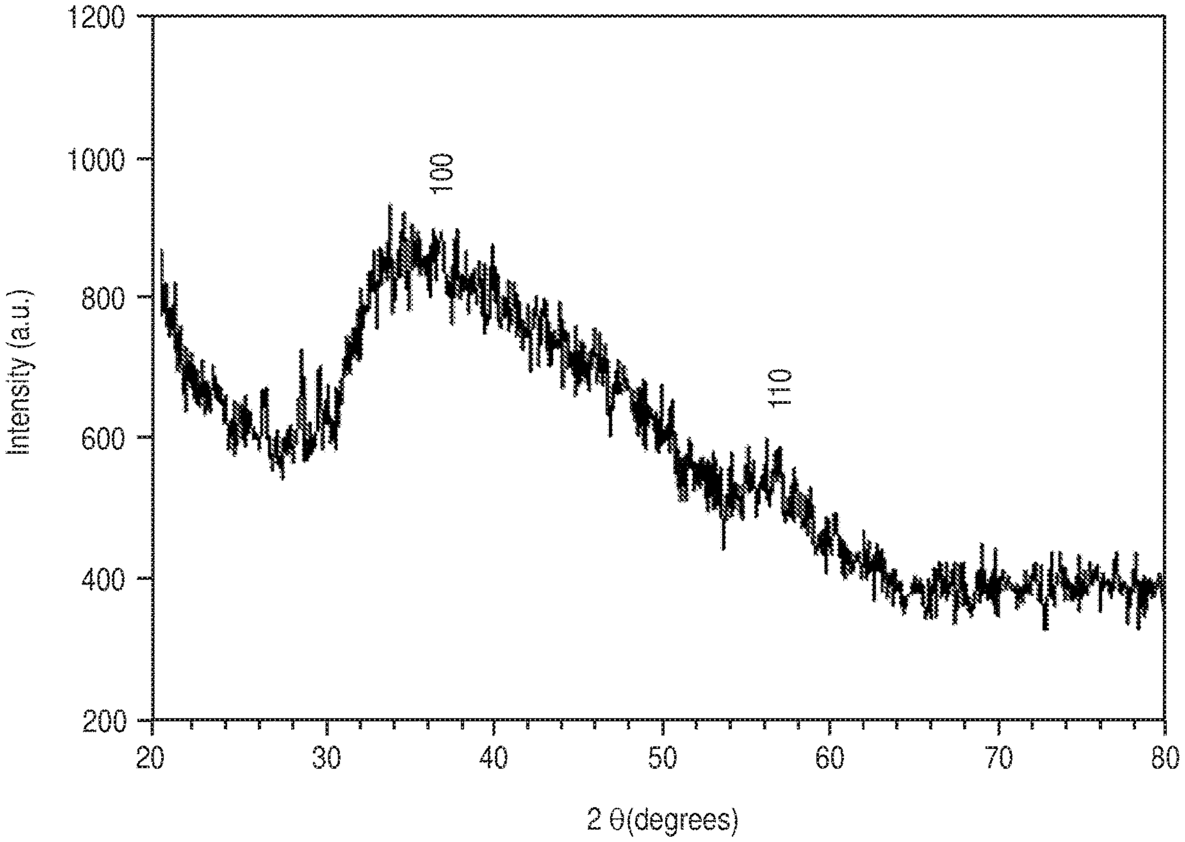
FIG. 16 shows an XRD spectrum of $MoS_2$ nanospheres according to one or more embodiments of the present disclosure.

Raman spectra of the $MoS_2$/rGO nanocomposite (FIG. 15) has typical peaks of rGO: a G band at 1571 $cm^{-1}$, assigned to the $E_{2g}$ phonon mode of $sp^2$ hybridized carbon atoms, and a D band at 1308 $cm^{-1}$, assigned to the breathing mode of k-point phonons of $A_{1g}$ symmetry that arise due to local defects and disorder, particularly at the edges of graphene sheets. However, the intensity ratio of the D and G bands ($I_D/I_G$) of the $MoS_2$/rGO nanocomposite (1.143) is slightly lower than that of rGO (1.168), this reduction is attributed to the partial removal of oxygen-containing groups during reduction of GO to rGO by hydrothermal process and interactions between the $MoS_2$ nanospheres and the rGO framework. XRD spectrum of $MoS_2$ nanospheres (FIG. 16) shows weak and wide peaks centered at 35° (100) and at 56° (110), these spectra reflect amorphous-alike material with poor crystallinity, as $MoS_2$ nanospheres have very thin wall of approximately 10 nm that resembles mono or few layers of 2D $MoS_2$ material. The above-described results confirm the successful fabrication of $MoS_2$/rGO nanocomposite by combining rGO nanosheets with $MoS_2$ nanospheres by hydrothermal process.

Figure 10A:
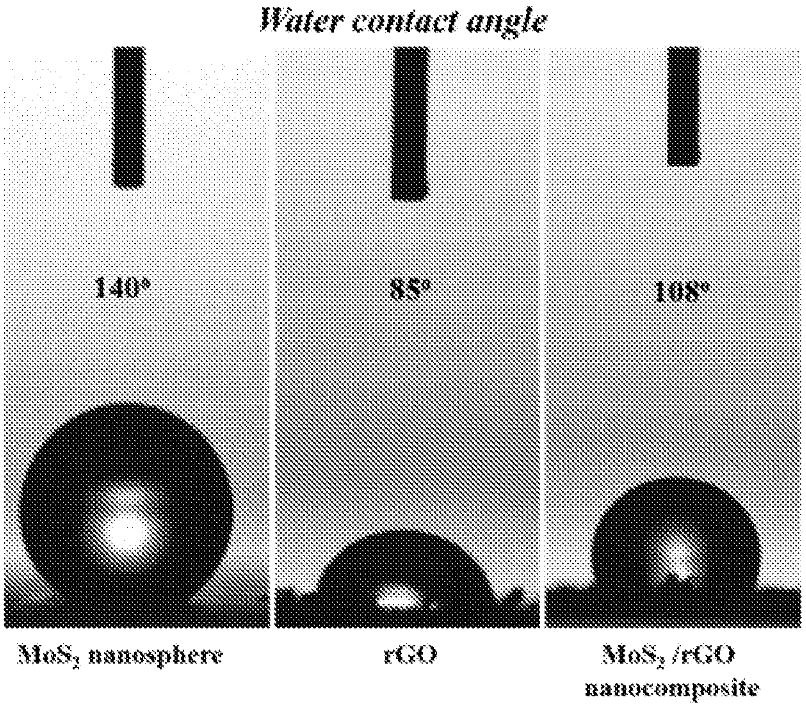
FIGS. 10A-B show (A) water contact angle and (B) oil contact angle measurements of the $MoS_2$ nanospheres, rGO and $MoS_2$/rGO nanocomposite, respectively.
Figure 10B:
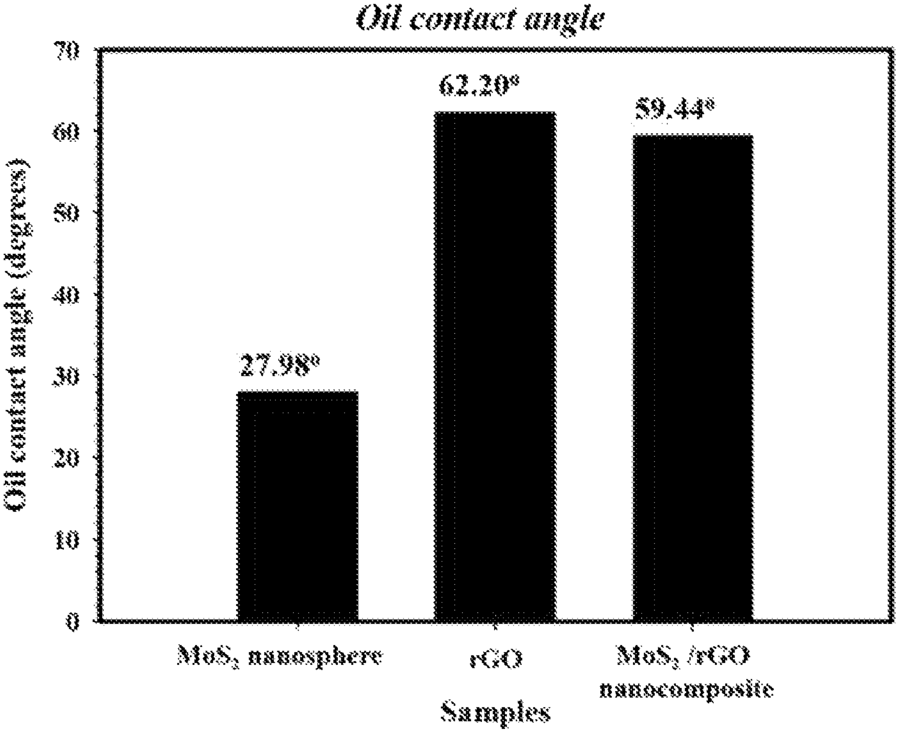

The characterization of the amphiphilic Janus property of $MoS_2$/rGO nanocomposite by water and oil contact angle analysis are shown in FIGS. 10A-B. The $MoS_2$ nanospheres have water contact angle of 140° and oil contact angle of 27.98° confirming its strong hydrophobic as well as good oleophilic property, whereas the rGO exhibits water contact angle of 85° and oil contact angle of 62.20° indicating its partial hydrophilic feature with relatively good wetting property as well as less oleophilic. Overall, the $MoS_2$/rGO nanocomposite combined of both rGO and $MoS_2$ nanospheres components manifests the water contact angle of 108° and oil contact angle of 59.44°. The water contact angle of 108° results from the moderately asymmetric nature of $MoS_2$/rGO nanocomposite with partial oleophilic and partial hydrophilic regions offered by its Janus type structure. Thus, the respective oleophilic $MoS_2$ and hydrophilic rGO components contributed to the substantial amphiphilicity as supported by water and oil contact angle results, which induces strong surface activity. As a result, this Janus $MoS_2$/rGO nanocomposite is expected to foster efficient separation of fine oil droplets from oil in water emulsion.

Effective Removal Fine Oil Droplets from Water

Figure 11A:
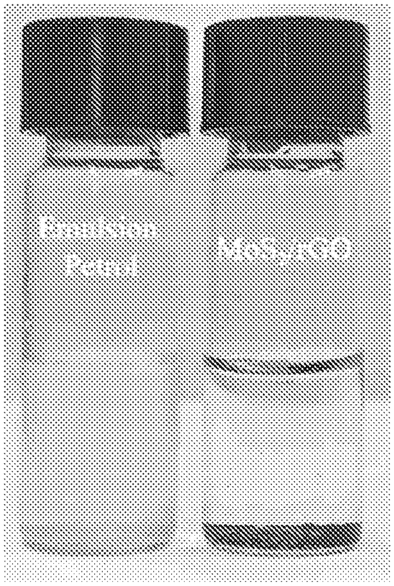
FIGS. 11A-B show (A) descriptive photographs of Janus $MoS_2$/rGO nanocomposite mediated separation of petrol in water emulsion; and (B) descriptive photographs (from left to right) of a petrol in water emulsion and $MoS_2$, rGO, and Janus $MoS_2$/rGO nanocomposite mediated separation of petrol in the water emulsion.
Figure 11B:
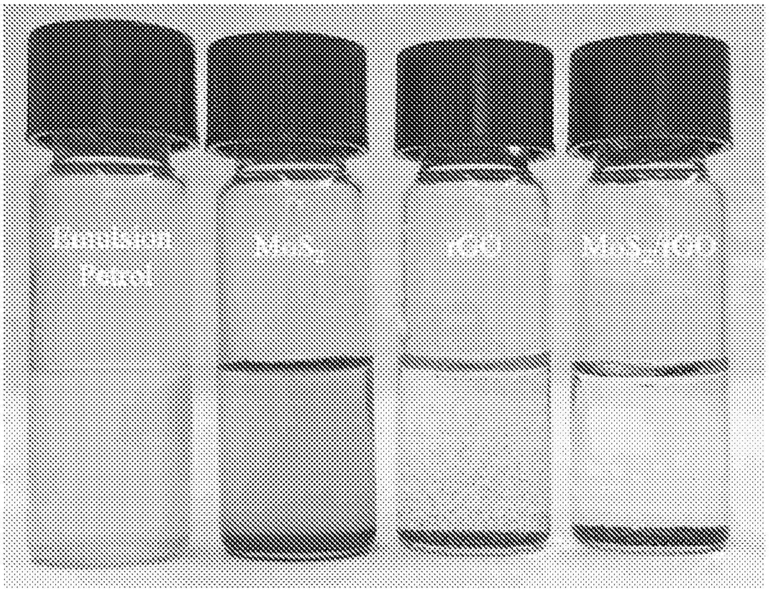

First, qualitative experiments as shown in FIGS. 11A-B were conducted to investigate the effectiveness of employing Janus $MoS_2$/rGO nanocomposite in removal of fine petroleum droplets from water. The petroleum and water emulsion (1% v/v) (FIG. 11A, left) exhibited a vivid opaque whitish color due to presence of numerous tiny petroleum droplets miscible in water. After adding Janus $MoS_2$/rGO nanocomposite (1 mg/ml) into the emulsion and followed by shaking for 100 s, the solution become completely clear with good transparency, the nanocomposite particles settled at the bottom as displayed by FIG. 11A (right). For comparison purpose, experiments of adding oleophilic $MoS_2$ alone and hydrophilic rGO alone were also conducted as shown in FIG. 11B, respectively. After 100 s of shaking, for the emulsion added with $MoS_2$, the opaque whitish color turned into opaque brownish color with lack of transparency, with oleophilic $MoS_2$ nanospheres remain suspended in the emulsion; for the emulsion added with rGO, opaque whitish color had decreased significantly but the emulsion was still less clear than that of $MoS_2$/rGO, with most of rGO settled at the bottom due to its hydrophilic nature. These results clearly demonstrated that, among the three experiments, the emulsion added with Janus $MoS_2$/rGO nanocomposite demonstrated the most rapid and effective removal of petroleum droplets from water.

Figure 12A:
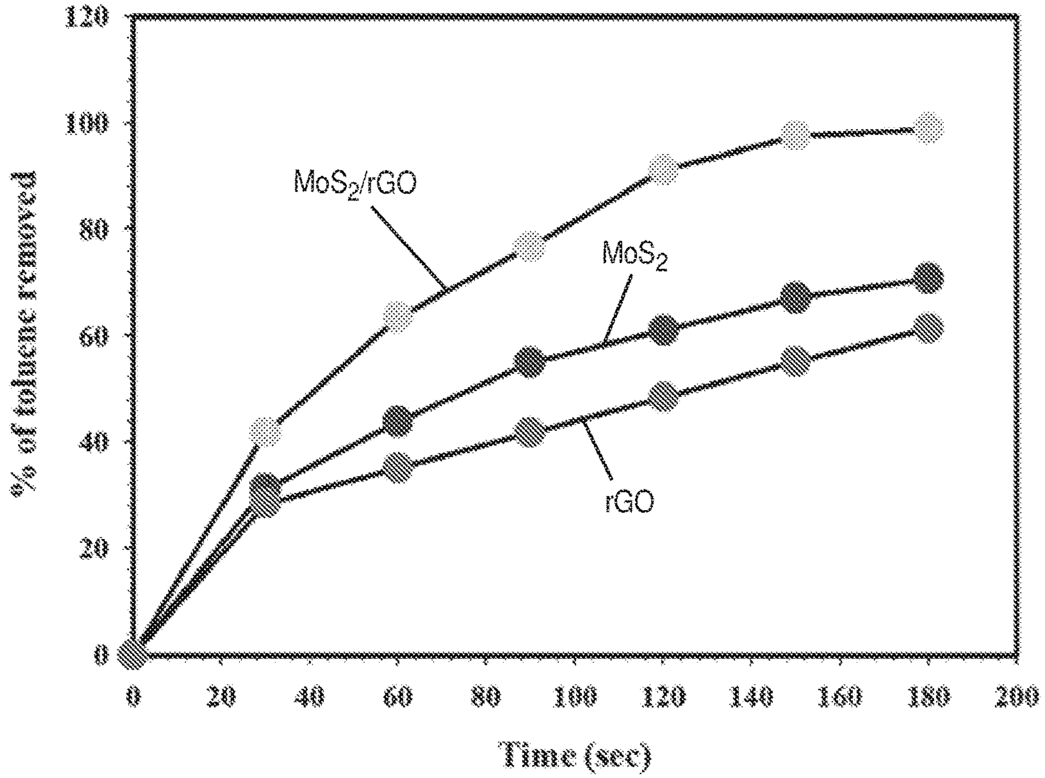
FIGS. 12A-B show (A) separation efficiency of toluene by Janus $MoS_2$/rGO nanocomposite, $MoS_2$ and rGO of toluene in water emulsion; and (B) Separation efficiency of virgin and regenerated Janus $MoS_2$/rGO nanocomposite samples.
Figure 12B:
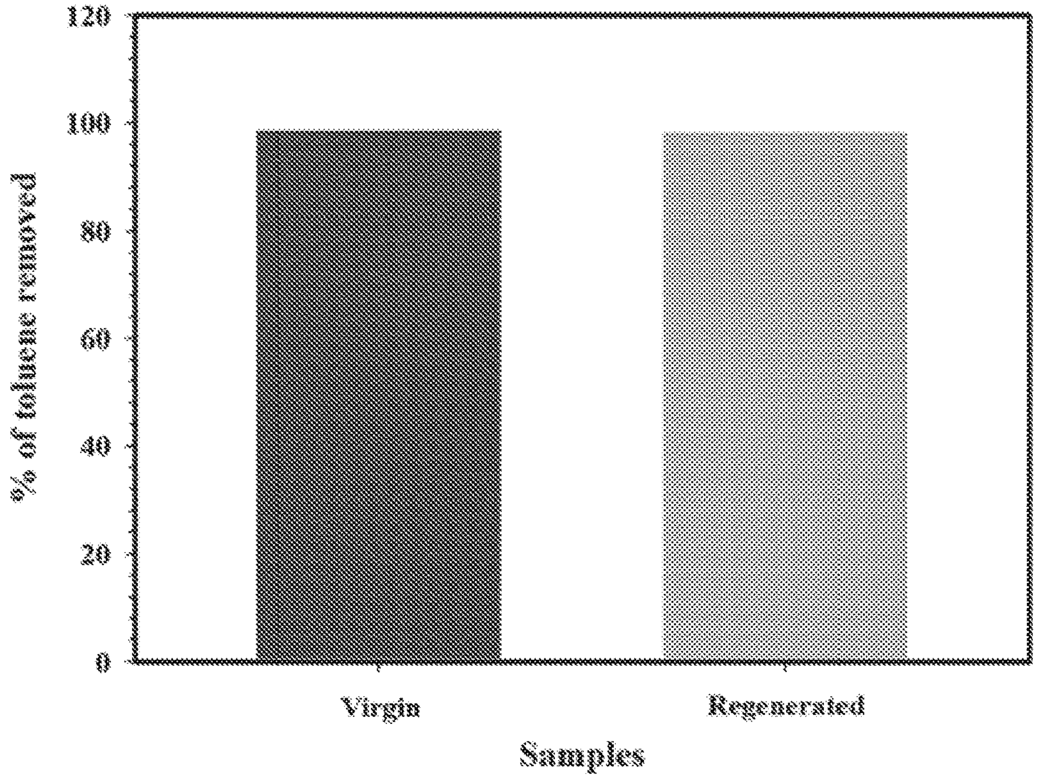

Second, in a series of experiments, the quantitative removal of toluene versus contacting time by Janus $MoS_2$/rGO nanocomposite, $MoS_2$ and rGO were investigated by measuring the percentage of toluene removed from toluene and water emulsion. As shown in FIG. 12A, the percentage of toluene removal increased with increasing shaking time for all three cases. In case of Janus $MoS_2$/rGO nanocomposite, the separation efficiency increased with contacting time and reached more than 95%, after 120 seconds, and 98.56% removal was finally achieved after 180 seconds. Meanwhile, the experiments with rGO alone and $MoS_2$ alone also illustrated increasing separation efficiency with contacting time but less significant than Janus $MoS_2$/rGO nanocomposite due to its homogenous nature. Moreover, after the spent $MoS_2$/rGO nanocomposite was regenerated by adding $H_2O_2$ at pH 10, as shown in FIG. 12B, the regenerated nanocomposite sample achieved 98.17% toluene removal efficiency. This result suggested almost complete recovery (99.60%) with no decline in removal efficiency and confirmed the excellent regeneration ability and recyclability of Janus $MoS_2$/rGO nanocomposite. These results clearly validate that the rapid and efficient removal of fine oil and toluene droplets from water have been achieved by using Janus $MoS_2$/rGO nanocomposite.

Figure 7C:
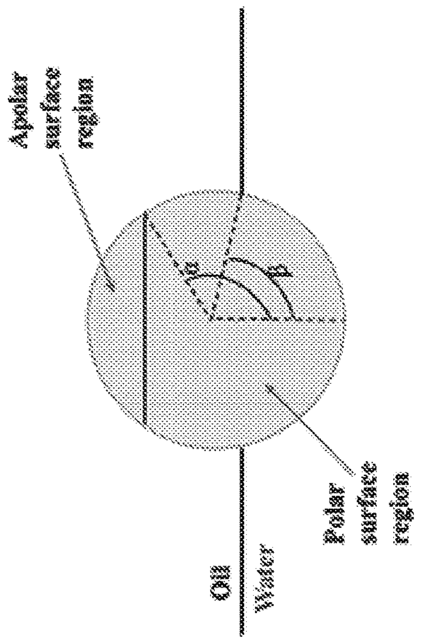

The underlying mechanism of the above demonstrated fine oil droplet removal by Janus $MoS_2$/rGO nanocomposite could be derived as follows: when compared to homogenous particles, Janus particles possess amphiphilicity due to diblock structure and constant contact angle along with surface activity. The overall property of the Janus particles can be tuned by varying the two contact angles $\theta_w$ and $\theta_o$, where $\theta_w$ is contact angle in water and $\theta_o$ stands for contact angle in oil; and by changing the ratio of two different areas α, β (FIG. 7*c*) where α is oleophilic region, β is hydrophilic region.

In an oil/water emulsion system, the positioning of particles at the fluid interface is dependent on the minimization of interfacial energy between solid and liquid and the interfacial energy between the two liquids. For Janus particles, these two energies work harmoniously together and reduce the energy of the system, whereas homogenous particles do not show such effects. The amphiphilicity of Janus particles bestow it by possessing several times higher desorption energy from a fluid interface compared to homogenous particle. When Janus particles are highly asymmetric, they can behave like a homogenous particle. These materials still have the dual chemical property, but ratio of their two different regions i.e., oleophilic or hydrophilic are either very large or very small.

The wetting properties of the Janus $MoS_2$/rGO nanocomposite were specifically designed to have an asymmetric structure with partial oleophilic, partial hydrophilic attributes. The total surface energy for the Janus $MoS_2$/rGO nanocomposite considering flat interface can be written as equation (2):

$$E(\beta) = 2\pi R^2\Big[\gamma(AO)(1+\cos\beta) + \gamma(AW)(\cos\alpha - \cos\beta) + \gamma(PW)(1-\cos\alpha) - \frac{1}{2}\gamma(OW)(\sin^2\beta)\Big] \quad (2)$$

assumed β>α in this case, i.e., hydrophilic region is greater than oleophilic region, where R is particle radius and γ (AO), γ (AW), γ (PW) and γ (OW) represents the respective interfacial energies of the apolar-oil, apolar-water, polar-water and oil-water interfaces.

Thus, the Janus $MoS_2$/rGO nanocomposite with partial oleophilic and partial hydrophilic attributes efficiently adsorb oil into their porous network from the emulsion driven by minimization of surface energy. Although the oleophilic $MoS_2$ component alone has low oil contact angle, but it is superhydrophobic (very high water contact angle) with very low wettability in water; and rGO alone is hydrophilic (low water contact angle), whereas it is not oleophilic, as a result, individual $MoS_2$ and rGO exhibit less surface activity in oil in water emulsion. Therefore, the amphiphilic Janus $MoS_2$/rGO nanocomposite with dual oleophilic and hydrophilic properties, has much higher surface activity at oil/water interface than the homogeneous particles, so can adsorb highly dispersed fine oil droplets efficiently in the oil and water emulsion.

CONCLUSION

The rational design and fabrication of a Janus $MoS_2$/rGO nanocomposite in which oleophilic $MoS_2$ nanospheres are embedded within the hydrophilic 3D reduced graphene oxide framework has been described. Firstly, the superhydrophobic $MoS_2$ nanospheres with uniform diameters and well dispersed few-layers GO nanosheets were synthesized separately; secondly, the 3D structure of nanocomposite consisting $MoS_2$ nanospheres within rGO sponge was obtained via a carefully controlled hydrothermal process. The amphiphilic Janus $MoS_2$/rGO nanocomposite exhibits unique oil/water interfacial properties compared to homogenous $MoS_2$ nanospheres and rGO. The amphiphilic Janus structure of the 3D $MoS_2$/rGO nanocomposite renders to achieve effective 98.56% removal of fine oil droplets from water within 3 min. After regeneration, the Janus $MoS_2$/rGO nanocomposite exhibited the nearly same removal efficiency. This excellent performance is attributed primarily to its Janus structure that offers amphiphilic surface property and high surface activity to enhance the adsorption of oil droplets effectively in the oil and water emulsion environment. Thus, the developed Janus $MoS_2$/rGO nanocomposite could be an excellent candidate for the emerging water treatment technology targeting to purify oil and gas produced water or other industrial wastewater.

Ex. 3 Materials No. 2: Amphiphilic Janus $MoS_2$/polymer nanocomposite sponge for removing oil from wastewater.

INTRODUCTION

Membrane filtration processes to remove oil have a common problem of membrane fouling by oil and other organics on the membrane surface. The fouling can significantly reduce the water flux (water production), so it faces an unresolved fouling problem.

This example describes an amphiphilic Janus nanocomposite sponge having a hydrophilic cellulose acetate framework with embedded oleophilic (hydrophobic) $MoS_2$ nanoparticles ($MoS_2$/CA). The amphiphilic Janus sponge is used as an adsorbent. The unique surface property allows high efficiency to adsorb fine oil droplets from diluted wastewater, as opposed a membrane in infiltration mode. This sponge adsorbent does not suffer from fouling issue. When the sponge is saturated, it can be easily collected and regenerated by $H_2O_2$ oxidation process, and then can be reused again and again. The 3D sponge hydrophilic/oleophilic structure enables high oil adsorption capacity in oil containing wastewater.

1 Synthesis of $MoS_2$/Cellulose Acetate Nanocomposite Sponge

Figure 13:
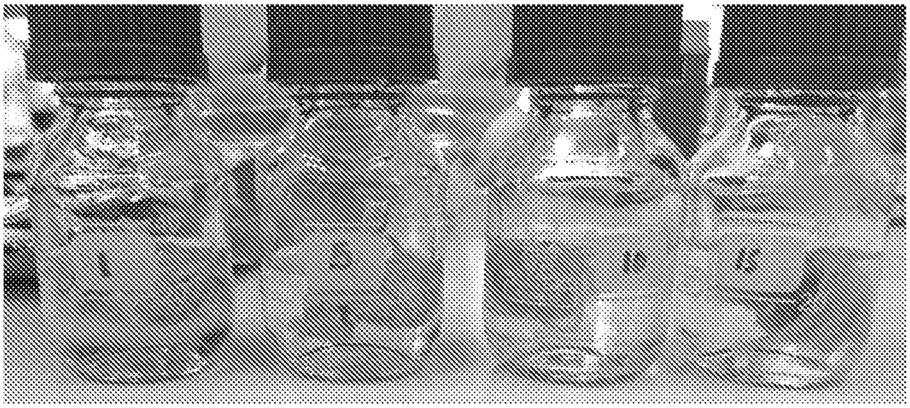
FIG. 13 shows $MoS_2$/Cellulose acetate (CA) nanocomposite sponge materials stored in water.

Sponges with 5-10 wt % $MoS_2$ nanoparticles were synthesized. Cellulose acetate, acetone and same $MoS_2$ nanoparticles (used in Materials No 1 (Ex. 2)) were added together and mixed well. For each concentration, the mixture was drop casted in the water and solvent bath by titration burette, to obtain the nanocomposite sponge. The sponges were separated by filtration followed by DI water washing. The obtained sponges were dried in the oven at mild temperature briefly and then stored in water till further use. An exemplary $MoS_2$/CA sponge including 7.14 wt % of $MoS_2$ nanoparticles is shown in FIG. 13.

2. Experiments on Removal of Oil Droplets from Oil/Water Emulsion

Figure 14:
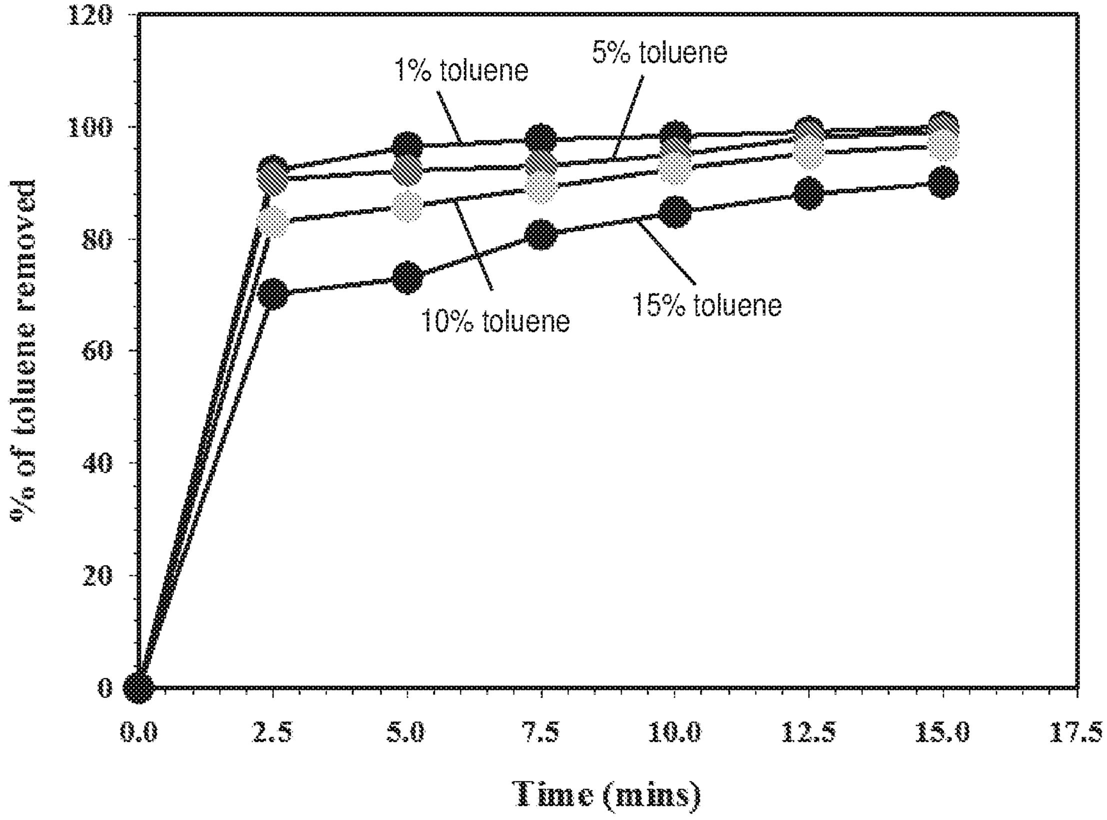
FIG. 14 shows removal efficiency of toluene by cellulose acetate-$MoS_2$ nanocomposite sponge over time for different percent toluene-in-water emulsions.

The qualitative experiments were conducted by using $MoS_2$/CA nanocomposite sponge in removal of fine petroleum droplets from water. The petroleum and water emulsion were prepared from 1, 5, 10, and 15 wt. % respectively. The amphiphilic Janus $MoS_2$/CA nanocomposite was added to the emulsion. Very high efficiency removal was achieved as shown in FIG. 14.

Various examples have been described. These and other examples are within the scope of the following claims. Although the description above contains much specificity, these should not be construed as limiting the scope of the disclosure, but as merely providing illustrations of some of the presently preferred embodiments of this disclosure. It is not intended to be exhaustive or to limit the disclosure to the precise embodiments. The example embodiments explain the principles of the disclosure and its practical application to thereby enable others skilled in the art to best utilize the disclosure in various embodiments and with various modifications as are suited to the particular use contemplated. Various combinations or sub-combinations of the specific features and aspects of the embodiments may be made and still fall within the scope of this disclosure. Features and aspects of the disclosed embodiments can be combined with or substituted for one another. Thus, the present disclosure should not be limited by particular disclosed embodiments described above.

The scope of this disclosure should be determined by the appended claims and their legal equivalents. All structural, chemical, and functional equivalents to the elements of the above-described preferred embodiment that are known to those of ordinary skill in the art are expressly incorporated herein by reference and are intended to be encompassed by the present claims. No element, component, or method step in the present disclosure is intended to be dedicated to the public regardless of whether the element, component, or method step is recited in the claims. Reference to an element in the singular is not intended to mean "one and only one" unless stated explicitly.

What is claimed is:

1. A Janus composite the composite comprising a hydrophobic nanoparticulate component supported by a 2- or 3-dimensional hydrophilic framework, wherein the hydrophobic nanoparticulate component includes $MoS_2$ and the 2- or 3-dimensional hydrophilic framework includes cellulose acetate.

2. The composite of claim 1, wherein the hydrophobic nanoparticulate component is uniformly disposed on the 2 to 3-dimensional hydrophilic framework.

3. The composite of claim 1 having a net water contact angle of greater than 90° and a net oil contact angle of less than 70°.

4. The composite of claim 1, wherein the hydrophobic nanoparticulate component has a water contact angle within a range of about 135° to about 170° and an oil contact angle within a range of less than 40°.

5. The composite of claim 1, wherein the 2- or 3-dimensional hydrophilic framework has a water contact angle within a range of less than about 40° to about 90°.

6. A method of preparing a packed structure, comprising: partially packing or fully packing a structure with a Janus composite, the composite comprising a hydrophobic nanoparticulate component supported by a 2- or 3-dimensional hydrophilic framework, wherein the hydrophobic nanoparticulate component includes $MoS_2$ and the 2- or 3-dimensional hydrophilic framework includes cellulose acetate.

7. A method of separating oil from an oil-in-water emulsion, comprising:

providing a Janus composite, the composite comprising a hydrophobic nanoparticulate component supported by a 2- or 3-dimensional hydrophilic framework, wherein the hydrophobic nanoparticulate component includes $MoS_2$ and the 2- or 3-dimensional hydrophilic framework includes cellulose acetate;

providing an oil-in-water emulsion containing oil;

contacting the oil-in-water emulsion with the Janus composite; and separating the oil from the oil-in-water emulsion to produce a de-oiled water fraction.

8. The method of claim 7, wherein contacting includes flowing the emulsion over a filter device comprising the Janus composite, or flowing the emulsion through a cartridge comprising the Janus composite.

9. The method of claim 7, wherein the emulsion comprises petroleum refinery wastewaters, produced water, flowback water from fracking operations, water from industrial cleaning, water from steel manufacturing, bilge and ballast water, food processing wastewater, agricultural wastewater, or sewage effluent.

10. The method of claim 7, wherein the oil of the emulsion comprises dissolved organic carbon (DOCs), hydrocarbons, polycyclic aromatic hydrocarbons (PAHs), organic acids, phenols, or volatile compounds.

11. The method of claim 7 further comprising removing the de-oiled water fraction from the emulsion.

12. The method of claim 7 further comprising physical or chemical regeneration of the Janus composite for reuse.

13. The method of claim 6, wherein the structure is a cartridge, a sponge, or a filter device.

14. The method of claim 8, wherein the filter device further comprises a polymer.

* * * * *